(12) United States Patent
Rozenberg et al.

(10) Patent No.: US 7,941,853 B2
(45) Date of Patent: May 10, 2011

(54) DISTRIBUTED SYSTEM AND METHOD FOR THE DETECTION OF ETHREATS

(75) Inventors: Boris Rozenberg, Beer Sheva (IL); Ehud Gudes, Beer Sheva (IL); Yuval Elovici, Moshav Arugot (IL)

(73) Assignee: Deutsche Telekom AG, Bonn (DE)

( * ) Notice: Subject to any disclaimer, the term of this patent is extended or adjusted under 35 U.S.C. 154(b) by 525 days.

(21) Appl. No.: 12/125,263

(22) Filed: May 22, 2008

(65) Prior Publication Data

US 2008/0313734 A1    Dec. 18, 2008

(30) Foreign Application Priority Data

May 24, 2007   (IL) ......................................... 183390

(51) Int. Cl.
 *G06F 11/00*   (2006.01)
(52) U.S. Cl. ............................... 726/22; 726/23; 726/24
(58) Field of Classification Search .............. 726/22–25; 713/188
See application file for complete search history.

(56) References Cited

U.S. PATENT DOCUMENTS

| | | | | |
|---|---|---|---|---|
| 7,490,355 | B2 * | 2/2009 | Wong ............................... | 726/24 |
| 2008/0307524 | A1 * | 12/2008 | Singh et al. ....................... | 726/22 |
| 2009/0249184 | A1 * | 10/2009 | Dieberger et al. ............. | 715/227 |

OTHER PUBLICATIONS

D. Moore, C. Shannon, and J. Brown. Code-Red: A Case Study on the Spread and Victims of an Internet Worm. In Proceedings of the ACM Internet Measurement Workshop, Nov. 2002.
C. C. Zou, et al., Monitoring and early warning for internet worms. In Proceedings of the 10th ACM conference on Computer and communications security, Washington, 2003.
S. Singh, C. Estan, G. Varghese, and S. Savage. Automated Worm Fingerprinting. In Proceedings of the 6th Symposium on Operating System Design and Implementation (OSDI), 2004.
J, Newsome, B. Karp and D. Song. Polygraph: automatically generating signatures for polymorphic worms. In Proceedings of the Security and Privacy, 2005 IEEE Symposium.
Spitzner. Honeypots: Tracking Hackers. Addison Wesley, 2003.

(Continued)

*Primary Examiner* — Jung Kim
*Assistant Examiner* — Abdulhakim Nobahar
(74) *Attorney, Agent, or Firm* — Roach Brown McCarthy & Gruber, P.C.; Kevin D. McCarthy

(57) ABSTRACT

The invention relates to a distributed system for detecting eThreats that propagate in a network, which comprises: (a) graphs database storing at least one propagation graph, each graph describing the typical propagation over time of one eThreat class or a legitimate executable class within the network; (b) plurality of agents that are distributed in corresponding plurality of hosts within the network, each of said agents continuously monitoring the corresponding host and reporting to a Central Decision Maker (CDM) the identity of any new suspected executable, and the time in which said suspected executable has been first detected by said agent; (c) a CDM for: (c.1) receiving all said reports from said plurality of agents; (c.2) creating from said reports for each suspected executable a corresponding propagation graph which reflects the propagation characteristics over time of said suspected executable within the network, and (c.3) comparing each of said created graphs with said stored at least one propagation graph; (c.4) upon finding a similarity above a predefined threshold between a created graph and one of the stored graphs, concluding respectively that said executable belongs to the class as defined by said stored graph; and (c.5) conveying said conclusion to said agents, for optionally taking an appropriate action.

6 Claims, 17 Drawing Sheets

OTHER PUBLICATIONS

G. Portokalidis, A. Slowinska and H. Bos. Argos: an Emulator for Fingerprinting Zero-Day Attacks. In Proceedings of ACM SIGOPS ETJROSYS 2006, Leuven, Belgium, Apr. 2006.

T. Vogt. Simulating and Optimizing Worm Propagation Algorithms. Sep. 2003. http://www.securityfocus.com/library/WormPropagation.pdf.

Symantec Internet Security Threat Report. http://www.symantec.com.bo/region/se/seresc/download/istr_sept_2004.pdf.

Brent N. Chun, Jason Lee and Hakim Weatherspoon. Netbait: a Distributed Worm Detection Service. Intel Research Berkeley Technical Report IRB-TR-03-033, Sep. 2003.

C. Kreiblch et al., Honeycomb—creating intrusion detection signatures using Honeypots. In Proceed. of the 2nd Workshop on Hot Topics in Networks (HotNets-II), Nov. 2003.

H.A. Kim and B. Karp. Autograph: toward automated, distributed worm signature detection. In Proceedings of the 13th USENIX Security Symposium, Aug. 2004.

S. Forrest. A Sense of Self for UNIX Processes. In Proceedings of the IEEE Symposium on Security and Privacy. Oakland, CA. 120-128. 1996.

R. Thommes and M. Coates. Epidemiological Modeling of Peer-to-Peer Viruses and Pollution. In Proceedings of IEEE Infocom 2006.

C.C. Zou et al., Modeling and Simulation Study . . . of Internet E-mail Worms. IEEE Transactions on dependable and secure computing, vol. 4, No. 2, Apr.-Jun. 2007.

R. M. Anderson and R. M. May, Infectious diseases in humans, (Oxford University Press, Oxford, 1992).

R. Pastor-Satorras, A. Vespignani. Epidemic dynamics and endemic states in complex networks, Physical Review E 63, 2001.

Y. Moreno, R. Pastor-Satorras, and A. Vespignani. Epidemic outbreaks in complex heterogeneous networks. Eur. Phys. J. B 26, 521-529 (2002).

R. Pastor-Satorras and A. Vespignani. Epidemic spreading in scale-free networks. Phys. Rev. Lett. 86, 3200-3203 (2001).

C. Faloutsos, M. Faloutsos, P. Faloutsos. On power-law relationships of the Internet topology. In Proceedings of ACM SIGCOMM, Aug. 1999.

D. Moore, V. Paxson, S. Savage, C. Shannon, S. Staniford, N. Weaver. Inside the Slammer worm. Security & Provacy, IEEE, Jul.-Aug. 2003.

S. Staniford, V. Paxson, N. Weaver. How to own the Internet in your spare time. In Proceedings of USENIX Security Symposium, Aug. 2002.

C. Zou, D. Towsley, and W. Gong. On the Performance of Internet Worm Scanning Strategies. Performance Evaluation Journal, vol. 63, No. 7, Jul. 2006.

CERT, Advisory CA-2000-04, Love Letter Worm at http://www.cert.org/advisories/CA-2000-04.html.

M. Tubi, R. Puzis, Y. Elovici. Deployment of DNIDS in Social Networks, ISI 2007: 59-65.

Network Worms at http://www.viruslist.com/.

* cited by examiner

DISTRIBUTED SYSTEM AND METHOD FOR THE DETECTION OF ETHREATS

FIELD OF THE INVENTION

The present invention relates in general to a system for detecting contaminating (illegal) software code, such as malware, in computerized systems. More particularly, the invention relates to a system which automates the detection. The system comprises plurality of distributed agents that are installed on many computers, and a Centralized Decision Maker module (CDM) that interacts with the agents upon detection of a potential malware, and receives from them their corresponding reports. Based on said reports, the CDM produces a propagation graph for that potential malware. In a next stage, the propagation graph is compared with pre-stored propagation graphs of objects that are known to be malware.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

The variety of electronic threats (eThreats) to computerized devices can be classified into three main categories: worm-related, non-worm related (i.e., virus, Trojan) and probes (i.e., adware, spyware, spam, phishing). The scientific community focuses on detection of new worms, since they propagate in an alarming speed. Other types of eThreats receive significantly smaller attention in the literature.

eThreat detection systems can be classified into host-based systems and network-based systems based on the source of the audit data they use. Typically, in both cases, new eThreats are detected by a security expert using anomaly detection based system. Then, after analyzing an instance of the eThreat, experts manually derive the signature that will be used by anti-virus software and intrusion detection/prevention systems for online detection of the eThreat. The manual signature extraction is an expensive and slow process.

Different techniques for automatic eThreat detection and containment have been proposed. The proposed techniques can be divided into four main categories: scan detection, honeypots, behavioral analysis, and static analysis of executables. The first two techniques are more generic and can be applied for the detection of various eThreat types, while the other two techniques are applicable only for the detection of worms. Each of said categories will be discussed briefly later in this description. The main drawback of scan detection methods and honeypots-based methods is that they are able to detect only specific types of worms. Behavior analysis methods require expensive training and are typically capable of detecting the existence an eThreat in predefined applications only. Static analysis techniques have difficulty handling obfuscated and/or encrypted eThreats. One common drawback of all said techniques is the high false alarm rate associated with them.

Therefore, an automatic and real time detection of unknown eThreats of various types is still an open challenge.
Static Analysis of Executables Systems belonging to this category take an executable as an input and classify it as belonging to the "normal" or "malicious" class without running it. Several approaches for performing said classification have been proposed. Typically, these approaches are based on various machine learning and data mining techniques that produce classifiers, for example, in the form of decision trees or rules. One common way for producing a classifier is to collect data components which are labeled either as "malicious" or "normal", and then to apply a learning algorithm on the labeled data components, thereby to construct a classifier which is capable of determining whether another data component which is new and unseen before belongs to the "normal" class or to the "malicious" class.

The major disadvantage of the static analysis approach based techniques is their inability to deal with obfuscated and encrypted eThreats.
Behavior-Based Detection Approach Typically, the systems belonging to this category build models of normal program behavior and then attempt to detect deviations in the observed behavior from the normal model. Variety of anomaly detection techniques utilizing this approach have been proposed.

A main drawback which is involved in the anomaly-detection based techniques is the requirement for complex and frequent training of the system to separate "noise" and natural changes from real eThreats. Updates of legitimate program may result in false alarms, while eThreats actions that seem to be normal may cause missed detections. Further, most applications that are based on anomaly detection identify attacks only on specific processes.
The Scan Detection Approach One of the first approaches for detecting random propagated worms is the use network "telescopes". Network "telescopes" are network devices that monitor unused IP addresses [1]. Such devices are able to detect randomly propagated worms in real time. An interesting extension of this technique has been proposed in [2]. The authors of [2] propose a system for Monitoring and Early Detection of Internet Worms. The system consists of monitoring devices (placed on sub-net routers) and a Centralized Malware Warning Center (MWC). The monitoring devices log incoming traffic to unused local IP addresses and outgoing traffic to the same ports, and continuously send observation data to the MWC. The MWC collects and aggregates reports in every monitoring interval in real-time. For each TCP or UDP port, MWC has a predefined alarm threshold. If the monitored scan traffic is found to be above the alarm threshold, the MWC activates an estimation logic module that verifies whether the number of reports increases exponentially over time. If the answer is positive, the system triggers an alarm.

There are two significant drawbacks associated with the pure scan detection approach, as follows: (a) The scan detection approach can detect only randomly propagated worms; and (b) The scan detection approach can only provide the IP address of infected sites, and can not provide any other characteristics to further serve the containment clearance process. Systems such as presented in [3, 4] try to overcome these drawbacks. In [3], for example, the authors point out that network worms must generate significant traffic that contains common substrings, wherein said traffic is directed between a variety of different sources and destinations. The system proposed in [3] detects such traffic and automatically generates signatures by extracting common byte patterns from suspicious flows. This approach works under the assumption that there is a single payload substring that remains invariant in all worm instances, an assumption that does not hold for polymorphic worms, for example. In [4], the authors present a system that automatically generates signatures that consist of multiple disjointed content sub-strings, such as protocol framing, return addresses, and poorly obfuscated code. According to the presented results, this system detects polymorphic worms with low false negatives and false positives.

The Honeypots Approach

Still another approach for the detection worm is to use Honeypots. A Honeypot is a vulnerable network decoy which is used for disturbing attackers, for early warnings about new attack techniques, and for performing a thorough analysis of the attackers' strategies [5]. By definition, a honeypot does not run legitimate services, and therefore it should not receive or generate any network traffic. This fact removes the existence of false positives and false negatives that are a major problem for other types of detection systems. Further, the body of the attack can be manually captured and then analyzed to extract a signature. The slow review of the log which has to be manually performed, and its dependency on how quickly the honeypot has been compromised by an eThreat, makes honeypots unsuitable for real-time detection.

Argos [6] tries to overcome these problems. In [6] the authors note that in order for an attacker to compromise some program, the attacker must change with his own input the execution flow of the program by overwriting a code which is normally derived from a trusted source. The proposed system is an x86 emulator which tracks network data throughout the execution and identifies their invalid use as jump targets, function addresses, instructions, etc. When an attack is detected, the system automatically creates a signature and supplies it to a cooperative IDS/IPS. Argos approach is designed as a honeypot that runs real services and its IP address is published in the hope of making it visible to attackers employing hit lists rather than random IP scanning. This technique gives a comprehensive solution for the detection, characterization, and containment of self-propagated worms, but other eThreat types remain unhandled.

A wide research on worm propagation techniques has been published. Most of this research addresses the spread of worms in the context of the global Internet. Vogt [7], for example, builds a simulation network to test the impact of various strategies on the overall rate of propagation. According to the report of Vogt the factors with the largest impact on the propagation are:
1. Address selection techniques: Fully random, local preference random, and sequential scanning.
2. Threading: A single thread of scanning produces a slower rate of propagation than multiple threads.
3. Pre-scanning: Performing pre-scanning to determine if a host is listening on a given port.
4. Method of scanning or infection: The use of efficient techniques to minimize the wait time for infection or for having the scan results.

All the abovementioned approaches, techniques, and systems do not provide so far a complete and fully reliable solution to the problem of the spreading of eThreats, particularly malwares, within networks of many computers. Each solution has its advantages and drawbacks. Therefore, many systems apply several protection approaches that work in parallel. Of course, the more approaches and techniques that operate in parallel, the more reliable the network becomes. However, a complete solution has not yet been found, and additional solutions are still necessary.

SUMMARY OF THE INVENTION

The present invention relates to a distributed system for detecting eThreats that propagate in a network, which comprises: (a) graphs database storing at least one propagation graph, each graph describing the typical propagation over time of one eThreat class or a legitimate executable class within the network; (b) plurality of agents that are distributed in corresponding plurality of hosts within the network, each of said agents continuously monitoring the corresponding host and reporting to a Central Decision Maker (CDM) the identity of any new suspected executable, and the time in which said suspected executable has been first detected by said agent; (c) a CDM for: (c.1) receiving all said reports from said plurality of agents; (c.2) creating from said reports for each suspected executable a corresponding propagation graph which reflects the propagation characteristics over time of said suspected executable within the network, and (c.3) comparing each of said created graphs with said stored at least one propagation graph; (c.4) upon finding a similarity above a predefined threshold between a created graph and one of the stored graphs, concluding respectively that said executable belongs to the class as defined by said stored graph; and (c.5) conveying said conclusion to said agents, for optionally taking an appropriate action.

Preferably, the report by the agents also comprises the identity of the report issuing agent.

Preferably, the comparison by the CDM is repeated plurality of times for each executable until a final conclusion is reached.

Preferably, each of the agents further performs analysis at the host location, for at least reaching a temporary conclusion regarding the type of the executable in question, and further sends said temporary conclusion to said CDM.

The invention also relates to the detection of worm type eThreates, wherein: (a) the database comprises null graphs; and (b) the CDM calculates from the created graph the value of $\alpha$ as a function of time, and if the value of $\alpha$ is found to be approximately constant within predefined limits and larger than zero during an initial propagation phase of said executable, the CDM concludes that the executable is a worm, wherein $\alpha$=(number of infected hosts at time t)/(number of infected hosts at time t−1).

In an embodiment of the invention for the detection of worm type eThreates, one of the graphs in the database relates to a worm-type eThreat class, said graph has a value of $\alpha$ as a function of time which is approximately constant within predefined limits, and is larger than zero during an initial propagation phase of said executable, and the CDM concludes that the corresponding executable is a worm when a similarity above a predefined threshold is found between said created graph and said pre-stored graph which relates to a worm.

Preferably, the propagation according to the invention relates to the number of hosts which include an executable as a function of time.

DETAILED DESCRIPTION OF PREFERRED EMBODIMENTS

The present invention provides a new method and system for automatically detecting and eliminating the spread of eThreats, particularly malwares in multi-computers networks. According to the present invention, a pre-storage database which stores propagation graphs of objects that are known to be eThreats is prepared. Next, a plurality of agents are distributed and positioned at many of the network nodes, and a Centralized Decision Maker module (CDM) is also provided to receive reports from said plurality of agents. The reports from the agents are issued either periodically or upon event, such as when a behavior suspected to be issued by a potential eThreat is detected by an agent. Based on said reports, the CDM produces a propagation graph for each executable which is suspected to be a potential malwares, and said report is compared with those propagation graphs within the database. Upon finding a statistical similarity above a predefined threshold, between the propagation graph of a suspected executable and one or more of the database graphs, an alert signal is issued.

The operation of the system of the present invention is based on the following principles, which according to the experience of the inventors look reasonable:

1. For any given network there is a unique subspace of Propagation Graphs for each eThreat class (e.g., virus, malware, adware. etc.).
2. eThreats Propagation Graphs significantly differ from the Propagation Graphs of legitimate executables.
3. It is possible to detect and confirm the appearance of a new eThreat by the production of a propagation graph using respective reports from many distributed agents, and comparing said produced propagation graph with the one or more of pre-stored Propagation Graphs, wherein preferably each pre-stored graph relates to one eThreat class.
4. The detection performance of distributed framework which comprises many agents is higher than the performance of a single agent.
5. The detection performance of said distributed framework improves with as the number of received reports from the distributed agents increases, Therefore, also the detection performance improves over time.

Figure 1A:
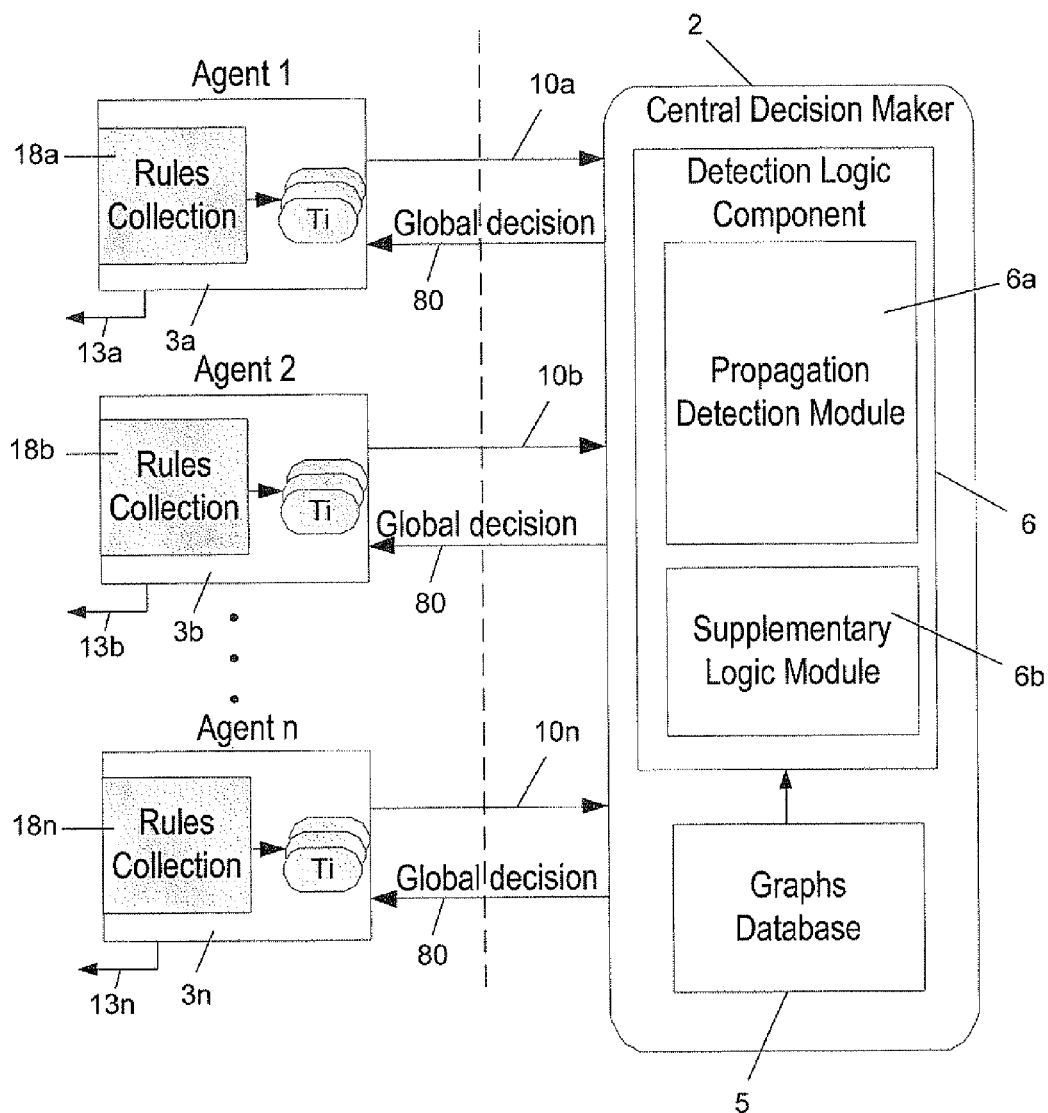
FIG. 1A is a block diagram illustrating the general structure of the system according to a first embodiment of the present invention.

FIG. 1A describes in block diagram form the general structure of the eThreat detection system 1, according to a first embodiment of the present invention. The system generally comprises a central decision unit (CDM) 2, and plurality, generally many, of agents 3a, 3b, . . . 3n that are distributed each within a separate node of the network 10. The CDM comprises a pre-storage 5, which contains plurality of characteristic propagation graphs. The stored graphs may relate each to a group of eThreats having a common characteristic behavior, or to a group of threats that belong to a same class of threats, or some graphs may even relate to one specific eThreat. The CDM 2 also comprises a logic unit 6, which comprises a propagation detection module 6a for comparing the propagation characteristic of a suspected graph with propagation characteristics of the pre-stored graphs in pre-storage 5, and a supplementary logic module 6b, which performs a similar comparison with respect to features other than propagation characteristic of the suspected eThreat.

In the embodiment of FIG. 1A, each of the agents 3a-3n comprises a corresponding collection of rules, 18a, 18b, . . . 18n, respectively, which characterize various eThreat classes. Each of the agents monitors at its corresponding node the execution of each executable, and using the set of rules, it determines whether this executable belongs to one of the eThreat suspected classes $T_i$. If the executable is found to be a suspected eThreat, the agent reports 10a-10n the suspected executable file ID, the time of the executable detection, and the suspected eThreat class, to the CDM 2 for further processing. The CDM 2, in turn receives the reports from plurality, generally many agents 3a-3n, and as said produces a propagation graph for that suspected eThreat. In one example, a graph for a specific eThreat may indicate the number of pieces of said suspected eThreat that have been respectively detected by the plurality of agents, as a function of time, wherein time "0" indicates the first time in which said specific eThreat was detected. Comparison of the produced graph with the pre-stored graphs provides a final "global decision" 80 respectively, regarding to whether this suspected eThreat is indeed an eThreat, and if so, what is its final eThreat class, and what action is necessary. This global decision 80 is sent, when necessary, to some or all the agents, and the agents, in turn convey (13a, 13b, . . . 13n) this determination to appropriate local means for taking appropriate action.

Figure 1B:
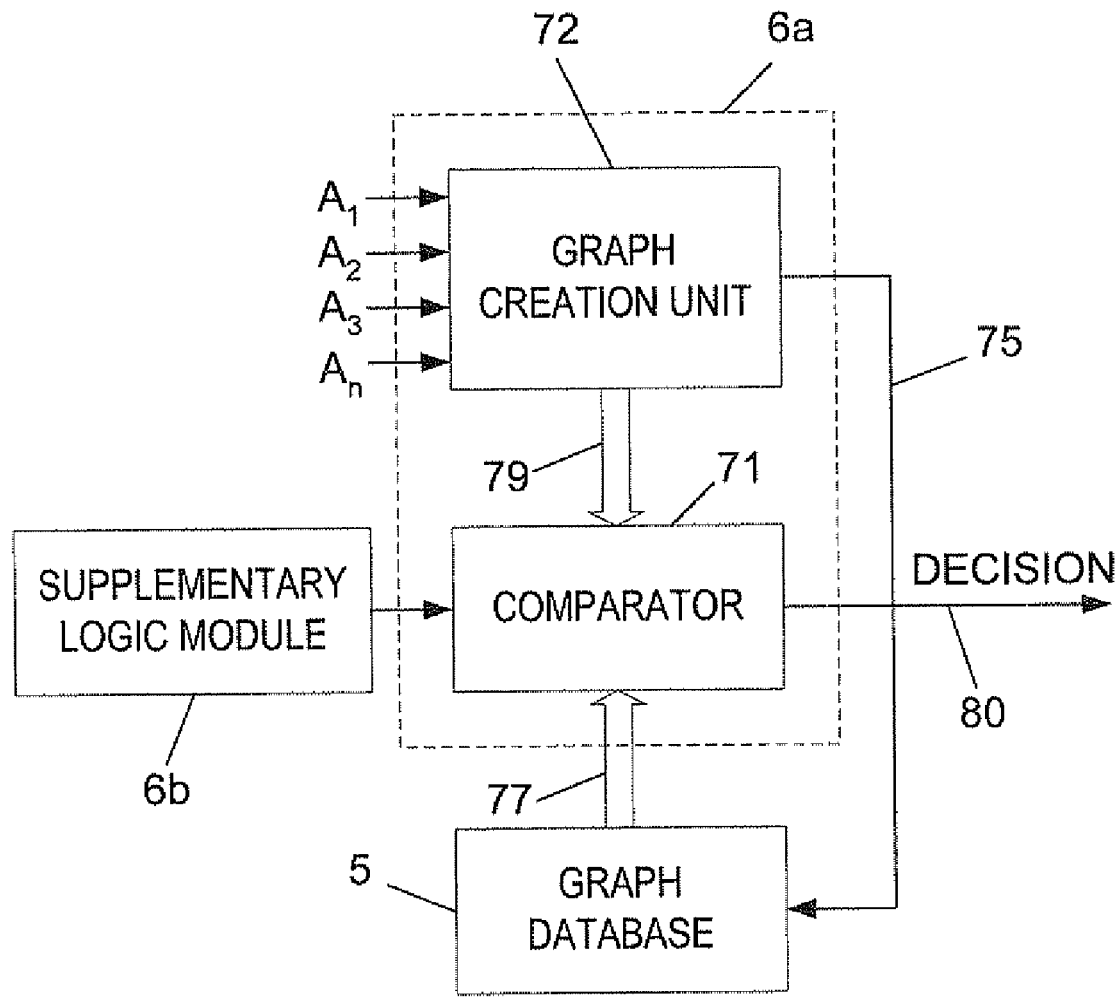
FIG. 1B illustrates in block diagram form the general structure of CDM 2.
Figure 1C:
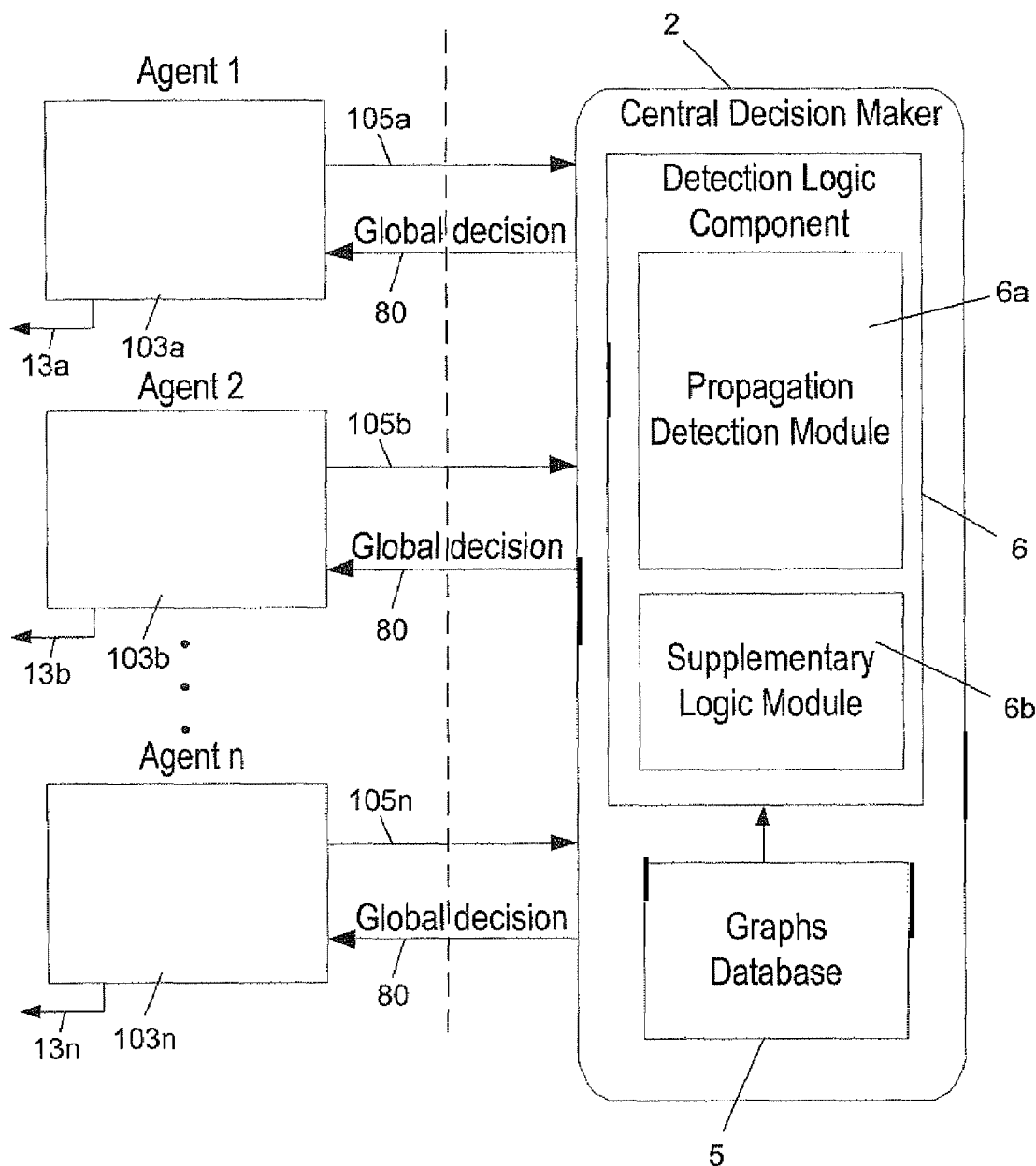
FIG. 1C is a block diagram illustrating the general structure of the system according to a second embodiment of the present invention FIG. 2 provides a propagation graph for the Slammer worm.

In a second embodiment, as shown in FIG. 1C, and as will be described in more details hereinafter, the agents 103a-103n are not intelligent as described for FIG. 1A, i.e., they do not perform any analysis, but alternatively they just report 105a-105n to CDM 2 about a detection of a new executable (i.e., the report contains an identification of the executable), together with the time of such detection, and with the ID of the agent. The rest of the analysis is performed by the CDM 2. In such a case the agents do not comprise rules collection 18a-18n (or merely comprise very minimal collection), as they also do not determine the eThreat class $T_i$. The operation of the CDM 2 in the embodiment of FIG. 1C is similar to the operation as described above with respect to the embodiment of FIG. 1A.

FIG. 1B illustrates in block diagram form the general structure of CDM 2, when operating with respect to one specific eThreat class. Agents 3a-3n (shown in FIGS. 1A and 1C), which are spread in various nodes throughout the network accumulate information regarding one specific eThreat class, and provide their reports to inputs $A_1$-An respectively. The reports are provided into graph creation unit 72, which accumulates said reports data $A_1$-An, and in turn produces in run time a graph specific to said eThreat, and which describes the propagation characteristics of said eThreat. It should be noted that the term "graph" does not necessarily relate to a visual graph. It generally relates to some accumulated digital data which describes the propagation of the specific eThreat over time. The graph creation unit 72 issues in run time a comparison signal 75, which causes an extraction of, one at a time, a corresponding pre-stored graph from database 5, which is conveyed 77 into a first input of comparator 71. At the same time, the newly created graph (based on the reports $A_1$-$A_n$ is supplied 79 into second input of comparator 71. The comparator, upon finding a similarity above a threshold value with one of the graphs of database 5, issues a corresponding decision signal 80. Supplementary logic module 6b provides to comparator 71 further logic considerations, such as those which have been accumulated from a previous operation of the CDM. Therefore, when a similarity of the created graph is found (or not) by comparator 71 to one or more of the various graphs in database 5, the decision 80 provides an indication whether the suspected executable is an eThreat, and if so, to what class of eTreat class it relates. Decision 80 is conveyed in parallel to agents 3a-3n, which in turn take a respective action within the host computers in which they reside. It should be noted, however, that in the private case when the system is targeted solely to verify whether the executable in question is indeed a worm or not, the database may contain null graphs. As explained in detail hereinafter, in said case when the system checks only for worms, the system creates a graph from all the received agents reports for a specific executable, calculates from the graph the value of $\alpha$ as a function of time, and if the value of $\alpha$ is found to be approximately constant (i.e., within predefined limits) and larger than zero ($\alpha$>0) during the initial propagation phase, the system concludes that the executable is indeed a worm.

The agents are software modules that are installed in many hosts and are responsible for reporting the CDM of suspected malicious executables. In a first embodiment, which is shown in FIG. 1A, the agent performs some analysis, and reports only about executables that are suspected to be malicious. In a second embodiment, which is shown in FIG. 1C, the agents report only about the executables identification and the corresponding time stamp at which they have been firs detected at the host. According to said first embodiment, the agent performs the following tasks:

1. It samples different features for each executable (vectors of various features);
2. It classifies vectors of features by a rules collection, and reports about any suspected executable to the CDM. Each report includes the suspected eThreat class, the executable file name, and the time in which the executable has first appeared at the host;
3. Following the processing by the CDM, the agent receives from the CDM the global decision 16a-16b respectively, i.e., an indication as to whether the file is indeed an eThreat or not, and the eThreat class;
4. It should be noted that each agent is autonomous to decide on the action that should be taken following the local determination of the eThreat class, or the receipt of the global decision from the CDM 2.

In the second embodiment (of FIG. 1C), each of the agents 103a-103n just reports to the CDM 2 the appearance of a specific executable at a corresponding node. For example, the report includes an identification of the agent node, an identification of the suspected executable, and the exact time in which the executable was first detected by the agent at that specific host. Then, having plurality (many) of such reports, the CDM 2 produces a propagation graph which describes the number of cases in which said executable was detected within the whole network as a function of time.

The CDM 2, using the propagation detection module 6a, compares the propagation graph, as produced from the agents reports (one graph for each executable) with all, or some of the pre-stored graphs in database 5, and concludes whether the file is an eThreat or not, and optionally also to what eThreat class the suspected executable relates. As said above, in the private case when the system only checks for worms, the database contains null graphs, and only the value of $\alpha$ is calculated and, this value is sufficient for verifying whether the executable is a worm or not. The conclusion of the propagation detection module 6a is conveyed to the various agents 3a-3n by means of decision signals 16a-16n.

As said, the determination by CDM 2 is mostly based on the propagation characteristic of the suspected executable (as reflected by the various propagation graphs). Optionally, the decision of the CDM may be also based on other characteristics, that may be reported by the various agents, and as analyzed by supplementary logic module 6b. This is particularly applicable to the cases in which the agents belong to the first embodiment type of agents, and in which the reports by the agents are more detailed.

According to an embodiment of the present invention, each report from the agents 3a-3n, or 103a-103n to the CDM 2 comprises at least the triple (NodeID, FileID, Time), wherein NodeID is a unique identifier of the local agent, FileID is a unique identifier of the suspected executable file, and Time is the time of detection of the executable by the local agent. Alternatively, instead of the NodeID, which in some cases indicates the address of the agent, each agent may send an AgentID which merely identifies the agent, but not its location. The propagation graphs as stored in database 5 summarize the expected propagation for each eThreat class throughout the network. Moreover, one or more of the propagation graphs within storage 5 may relate to the expected propagation behavior of legitimate executables, therefore also to enable negative determination, i.e., that an executable is a legitimate software. The propagation graph as produced by graph creation unit 72 (FIG. 1B) indicates the number of cases in which a specific executable has been in fact detected by the various agents throughout the network as a function of time.

According to the present invention, a collection of propagation graphs for as many as possible known classes of eThreats are stored in pre-storage 5. The production of the collection of graphs is performed off-line.

The off line phase which involves the preparation of CDM 2 for fulfilling its tasks comprises the following: (a) Determining the network infrastructure; (b) Spreading the agents throughout the network, and maintaining a record within the CDM regarding the location (e.g., node ID) of each agent; (c) optionally maintaining a record regarding the detection rate (capability) by each agent; and (d) Preparation of the various graphs and storing them within database 5.

During run time operation of the system, the CDM 2 builds a LOG file of the following type:

| Time | FileId | Hosts List |
|---|---|---|
| 17:00:00 | 43 | 140.103.18.177, 140.102.12.111, ... |
| 17:00:01 | 43 | 123.123.145.177, 143.123.432.123, 321.234.543.123, , , , |
|  | 22 | 122.322.343.123, 111.211.111.123, ... |
| --- | --- | --- |

The "Time" column indicates the time of detection of a specific executable within a specific host. The "FileID" column indicates the ID of the executable, and the "Host List" column indicates the corresponding addresses of the hosts in which the agents have detected the corresponding executables. Having the details above, the CDM uses the information as reported from the various agents to construct the various run time propagation graphs. For example, the CDM constructs in run time one graph for FileID 43, and another for FileID 22. The procedure is repeated during run time, and as more and more information is collected from the agents, the conclusion is more statistically reliable.

Theoretical Discussion and Examples

The following discussion presents a distributed system for the automatic detection of new worm-type eThreats in particular, but it may similarly be used for the detection of other types of eThreats, with the necessary modifications and adaptations. The system for the detecting of worms is preferably made in the structure of FIG. 1C, and it comprises distributed agents that are installed on many hosts, and a centralized decision maker module (CDM) 2 that interacts with the agents. The detection process is performed in two phases. In the first phase, agents detect new executables and send their unique identifier (for example, the executables CRCs) to the CDM. In the second phase, the CDM builds a propagation graph for each potential eThreat. Said propagation graphs are compared to known worms propagation graphs in order to determine whether the suspected executable is indeed a worm, and the CDM reaches a respective conclusion. All the agents are thereafter notified with the CDM conclusion. The present invention therefore introduces a new detection approach which is based on propagation characteristics that are common to worms wherein the worms may belong to different worm classes. The discussion first surveys different analytical models for various worms classes, and shows their similar behavior especially at the initial propagation phases. The discussion then shows that it is possible to detect a new worm appearance by utilizing a-priori knowledge regarding the suspected executable class (i.e., whether it was originated from a P2P communication, from an email, etc.). Furthermore, the discussion shows that object of the invention can be achieved by using a small number of agents that are distributed within the network. The advantage of proposed framework is that it does not require the installation any special device, and can be implemented on existing infrastructures merely by software installation.

Epidemic spreading of eThreats in networks has been widely studied in recent years. Common models of epidemic spreading categorize the population into three states: Susceptible (S)—individuals that are vulnerable and can possibly be infected; Infected (I)—individuals that have already been infected and can infect other individuals; and Removed (R)—individuals that are immune or dead such that they cannot be infected again, and cannot infect other individuals. With this terminology, two epidemic propagation models have been defined: Susceptible-Infected-Susceptible (SIS) model and Susceptible-Infected-Removed (SIR) model [15]. The SIR model states that any susceptible individual has a probability $\lambda$ to be infected in a unit of time by any infected neighbor. Infected individuals are removed with a probability $\gamma$ in a unit of time [15].

Not all epidemics bestow immunity to their victims. With epidemics of this kind, victims that are healed pass from the infected pool not to a removed pool, but back into the susceptible one with a probability $\gamma$. A model with this type of dynamics is called the SIS model.

A special case of the STS model is the SI model. In this model the probability $\gamma$ is equal to zero—it means that infected individual stays infected forever. The SIS model for homogeneous networks (networks in which each node has the same number of connections k) is described [16] by the following equation:

$$\frac{d\rho(t)}{dt} = -\rho(t) + \lambda k \rho(t)[1 - \rho(t)] \quad (1)$$

where $\rho(t)$ stands for the fraction of the infected nodes at time t. From this equation, the probability that a new individual will be infected is proportional to the infection rate $\lambda$, to the probability that an individual is susceptible $(1-\rho(t))$, and to the probability that a link from a susceptible individual leads to an infected one ($\rho(t)$). This model assumes the homogeneous mixing hypothesis [15] that states that each infected individual has the same opportunity to be in contact with any susceptible individual in the population.

For the SI model the equation (1) can be rewritten as follows:

$$\frac{d\rho(t)}{dt} = \lambda k \rho(t)[1 - \rho(t)] \quad (2)$$

Moreno et al [17] have presented the Susceptible-Infectious-Removed (SIR) model that describes the dynamics of epidemic spreading in complex networks. The model is represented by the following equations:

$$\rho_k(t) + S_k(t) + R_k(t) = 1 \quad (3)$$

$$\frac{d\rho_k(t)}{dt} = -\rho_k(t) + \lambda k S_k(t) \Theta(t) \quad (4)$$

$$\frac{dS_k(t)}{dt} = -\lambda k S_k(t) \Theta(t) \quad (5)$$

$$\frac{dR_k(t)}{dt} = \rho_k(t) \quad (6)$$

$$\Theta(t) = \frac{\sum_k k P(k) \rho_k(t)}{\sum_k k P(k)} \quad (7)$$

where $\rho_k(t)$, $S_k(t)$ and $R_k(t)$ are the densities of infected, susceptible, and removed nodes of degree k at time t, respectively, P(k) is the fraction of nodes with degree k and $\lambda$ is the probability that a susceptible node is infected by one infected neighbor. The factor $\Theta(t)$ provides a probability that any given link leads to an infected individual [18]. According to [19] the Internet network follows a power-law degree distribution. It means that $P(k) \sim k^\gamma$, where $2 < \gamma \leq 3$. Having defined the existing epidemic spreading models, the following discussion illustrates how these models can be applied for modeling the propagation of various known worm classes.

Following the definition in [25], Internet worms scan the Internet for machines with critical vulnerabilities in operation systems or applications, and send packets or requests which install either the entire body of the worm or a section of the worm source code, which in turn contains downloading functionality. Following the installation of said code, the main body of the worm is downloaded. In either case, once the worm is installed, it executes its code and the cycle is repeated.

Much research about the modeling of the propagation of Internet worms has been published. Most of the proposed models are based on the SI model, which is represented by differential equation (2) above. For example, to model random scanning worms such as Slammer [20], equation (2) can be modified as following [21, 22]:

$$\frac{d\rho(t)}{dt} = \frac{\eta}{\Omega}\rho(t)[1-\rho(t)] \qquad (8)$$

where η is the worm scan rate, and Ω is the size of IP space scanned by the worm.

Figure 2:
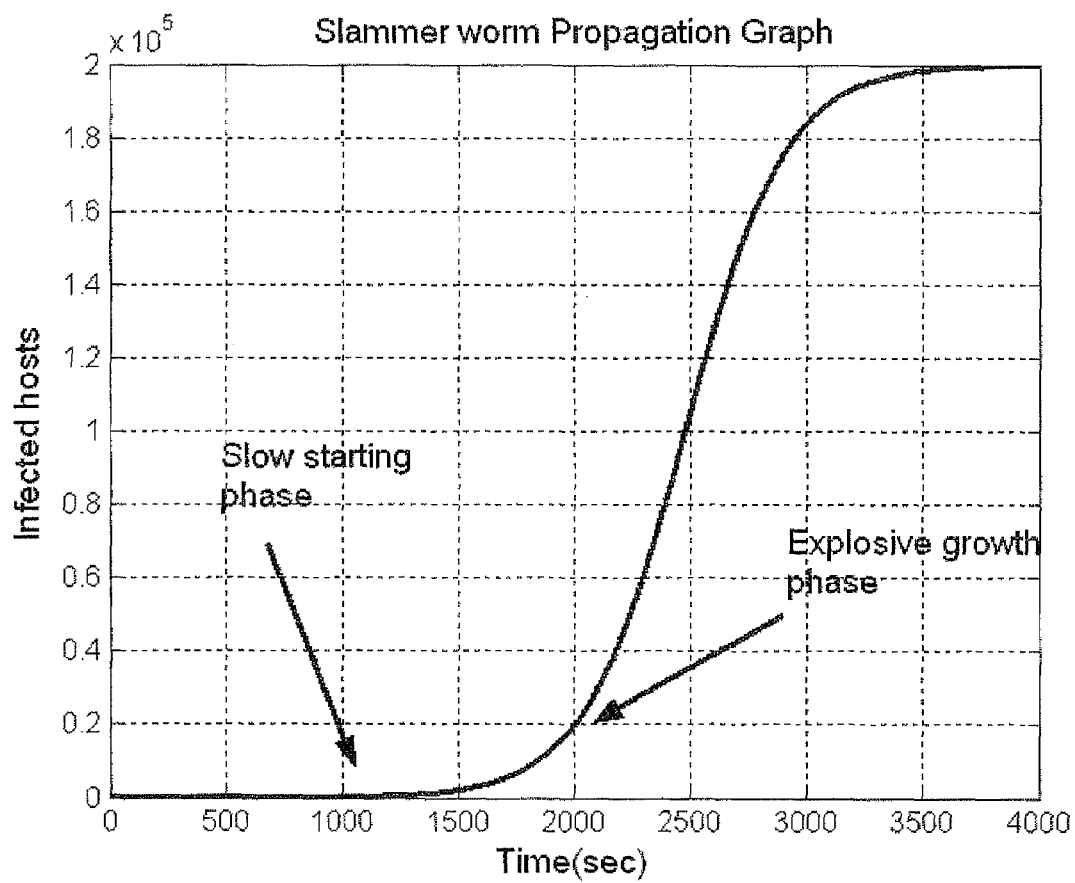

In order to determine the dynamic of the propagation of Internet worms the inventors have solved equation (8) using a discrete-time method and the Slammer worm propagation parameters as presented in [20] (200000 vulnerable hosts and scan rate equal to 100 probes per second). FIG. 2 presents the obtained propagation graph for the Slammer worm. It can be seen that during the slow starting phase, the number of infected hosts grows exponentially, and after about 1500 seconds a so called explosive growth phase [7] begins.

Since the model as represented by equation (8) assumes the homogeneous mixing hypothesis [15], it cannot be directly applied for modeling of scanning worms that use hit lists, local preference or other modifications of a random scanning algorithm. From an analysis of the modifications as presented in [7], it is clear that all scanning worms exhibit a propagation dynamics as follows: a slow starting phase during which the number of infected hosts grows exponentially, and an explosive growth phase during which the number of infected hosts grows linearly until saturation is reached.

Hereinafter, the invention will be discussed with a particular reference to three types of worms:

Email worms: This class of worm spreads via infected email messages [25]. The worm may be in a form of an attachment, or it may be a link within the email to an infected website. In both cases email is the vehicle. In the first case, the worm is activated when the user clicks on the attachment. In the second case the worm is activated when the user clicks on the link leading to the infected site. Once activated, the worm infects the victim machine (for example, it installs a backdoor), harvests email addresses from it, and sends itself to all addresses it obtains (machines' neighbors). Dynamics of this kind of propagation can be approximated by the basic SIR model (equations (3)-(7)) where λ is the probability that a user will open the attachment. A detailed analysis with respect to the propagation of worms of this class can be found in [14].

Figure 3:
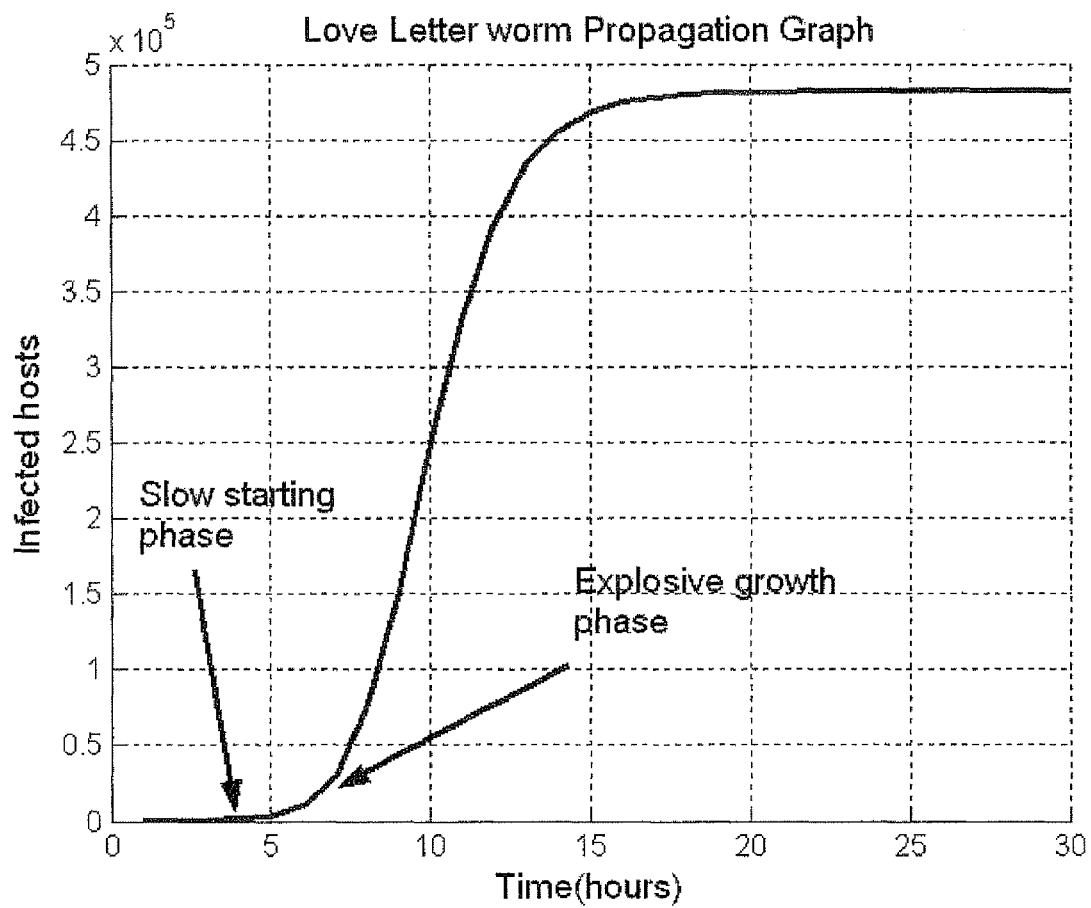
FIG. 3 provides a propagation graph for the Love Letter worm.

In order to determine the dynamic of propagation of Email worms the inventors have solved equations (3)-(7) using the discrete-time method and using parameters values as obtained from [23] for the Love Letter worm. FIG. 3 plots the results as obtained. It can be seen that during the slow starting phase the number of infected hosts grows exponentially, and after 5 hours an explosive growth phase begins.

P2P worms: Following the definition in [25], P2P worms copy themselves into a shared folder at the user computer under attractive names, and the P2P network makes the remaining job by itself. It informs other users about the existence of the new file, and it provides the infrastructure for downloading and executing the infected file. Propagation of this kind of worms has been modeled in [13]. In the context of the present invention, there is an interest only in propagation dynamics. In order to determine the propagation dynamics, the inventors have simplified the more comprehensive model presented in [13]. The propagation dynamics of P2P worms can be described by a modified SI model, as given by the following equation:

$$\frac{d\rho(t)}{dt} = \beta h(t)[1-\rho(t)] \qquad (9)$$

where β is the average rate at which users download files, h(t) is the probability that a downloaded file is infected, and ρ(t) is the density of infected hosts at time t. Following the definitions in [13], h(t)=ω*q(t), where ω>0, q(t) is a proportion of infected files in the network at time t, q(t)=K(t)/M where K(t) is the number of infected files in the network at time t, and M is a total number of files in the network. This model assumes that each infected host creates c copies of infected file. From the definitions above, K(t)=ρ(t)*c=>q(t)=ρ(t)*c/M=>h(t) =ω*ρ(t)*c/M and therefore equation (9) can be written in the form of the following equation (9.1):

$$\frac{d\rho(t)}{dt} = \lambda\rho(t)[1-\rho(t)] \qquad (9.1)$$

where λ=β×ω×c/M

Figure 4:
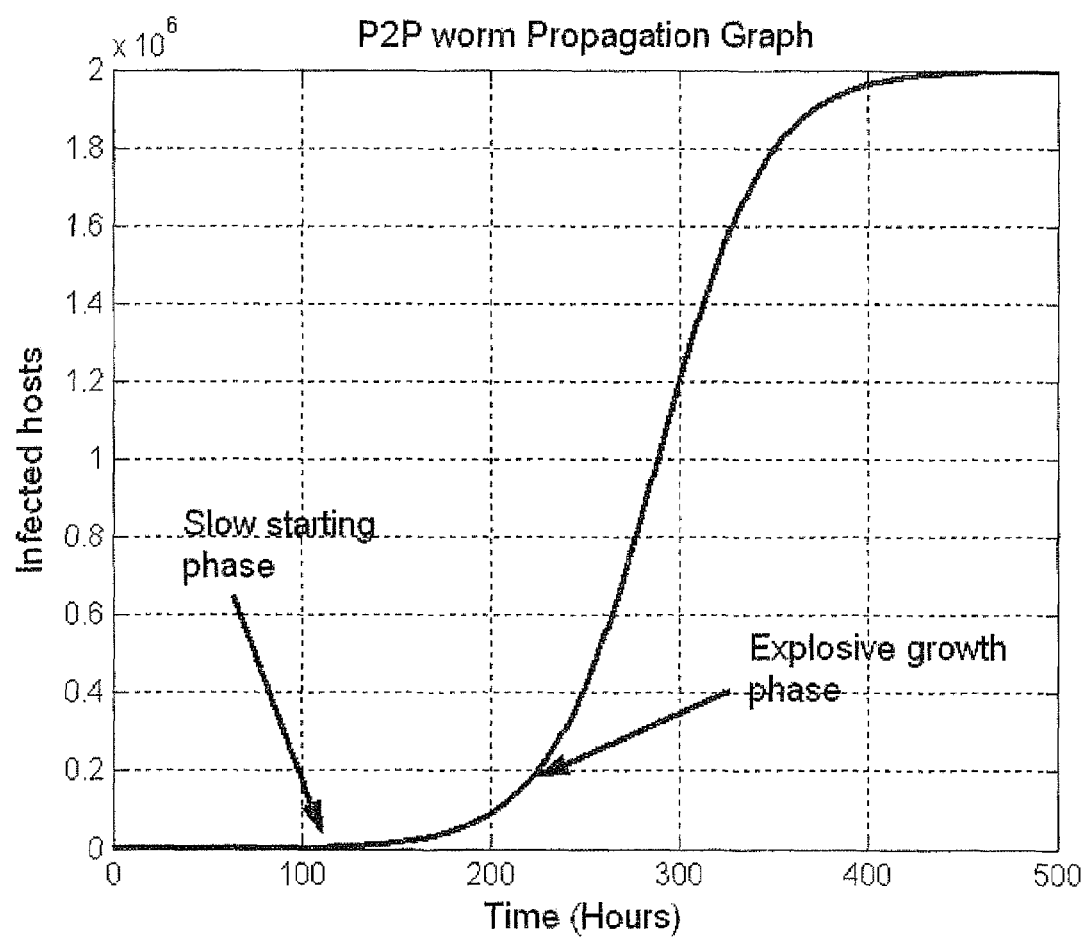
FIG. 4 provides a propagation graph for a worm which propagates by means of a P2P communication.

In order to determine the dynamics of the propagation of P2P worms, the inventors have solved equation (9.1) using the discrete-time method and the parameters values as obtained from [13] (β=0.0035, ω=0.5, N=2000000, M=60 010000, K(0)=100, ρ(0)=0.00005, c=10). The P2P propagation graph of FIG. 4 is the result of said calculation. It can be seen that during the slow starting phase the number of infected hosts grows exponentially, and after about 150 hours the explosive growth phase begins.

The discussion above has shown that all worm-related eThreats exhibit an exponential grow of the number of infected hosts during the early propagation stage. The following discussion describes how this property is utilized for the detection of worm-related eThreats. The approach as used by the inventors is based on two assumptions. The first assumption states that propagation graphs of new worm-related eThreats are similar to the propagation graphs of known worm-related eThreats. The second assumption states that the propagation graphs of legitimate executables differ from propagation graphs of worm-related eThreats.

Based on the above, the embodiment of the present invention for the detection of worm related eThreats provides a distributed system for the detection of new worm-related eThreats. The system comprises distributed agents and a Central Decision Maker module (CDM). As before, many agents are provided, wherein each agent is a software module which is installed on one host within the network, and is responsible for detection of suspected malicious executables. Each agent identifies new executables on the corresponding local machine, and sends for each of such executable a unique identifier (CRC for example) to the CDM. The CDM, which receives reports from the many distributed agents, builds a propagation graph for each executable, performs comparison with pre-stored propagation graphs for worm related executables, and concludes whether the file is worm related or not. Upon receipt by an agent from the CDM of a notification on a worm related executable, the agent takes any conventional measure for preventing the execution of the corresponding executable. In one embodiment, the agents are intelligent agents, wherein each agent monitors locally the executables behavior, and reports to the CDM only when it detects a potentially malicious file. In another embodiment, a much simpler agent is used, which reports just the about the detection of new executables, together with the time of their detection. Said latter approach seems to be preferable for detecting worm related eThreats, as even in this case the communication overhead is relatively small, and as only CRC are sent also privacy is not a problem. The embodiment of the invention which uses intelligent agents seems to be preferable in the case of detecting non-worm related eThreats.

As explained above, each file propagation graph is a statistical tool which describes the way that a file (eThreat or a legitimate software respectively) propagates in the network, and indicates for the a specific file type the number of computers hosting the file as a function of time (see, for example, FIGS. 2,3,4). The object of the invention is to determine whether the propagation of a specific file exhibits the property of an exponential growing of the number of infected hosts during the early propagation stage in one of said propagation graphs. As mentioned, the detection logic component 6 of the CDM (FIG. 1A) is responsible for this task. The following discussion demonstrates why all worm-related eThreats exhibit the above property. The discussion will also provide a criterion for the determination whether a given file meets this criterion or not.

It should be noted that for any propagation model referenced herein (for example, the models of FIGS. 2,3, and 4), the density of the infected hosts at the beginning of propagation is significantly smaller than the total number of hosts in the network (i.e., the population size). This observation allows the inventors to rewrite equations 6, 8, and 9 as follows:

$$\frac{d\rho(t)}{dt} \approx \alpha\rho(t) \quad (10)$$

for some value of $\alpha$ that depends on the specific propagation method. For example, for Internet worms, from equation (8)

$$\alpha = \frac{\eta}{\Omega}. \quad [22]$$

In the case of P2P worms, from equation (9.1) $\alpha=\lambda*\omega*c/M$. In the case of email worms the total fraction of infected hosts is given by the density of removed hosts ($R_k(t)$ from equation (6)) that also can be written in the form of equation (10). Denote $I(t)=\rho(t)N$ to be a number of infected hosts at time t (N is a total number of hosts in the network). With this notation, from equation (10) we receive:

$$\frac{dI(t)}{dt} \approx \alpha I(t) \quad (11)$$

Using a discrete time method to solve equation (10), we receive that:

$$I(t) \approx (\alpha+1)I(t-1) \quad (12)$$

Finally, from equation (12)

$$\alpha = I(t)/I(t-1)-1 \quad (13)$$

Figure 5:
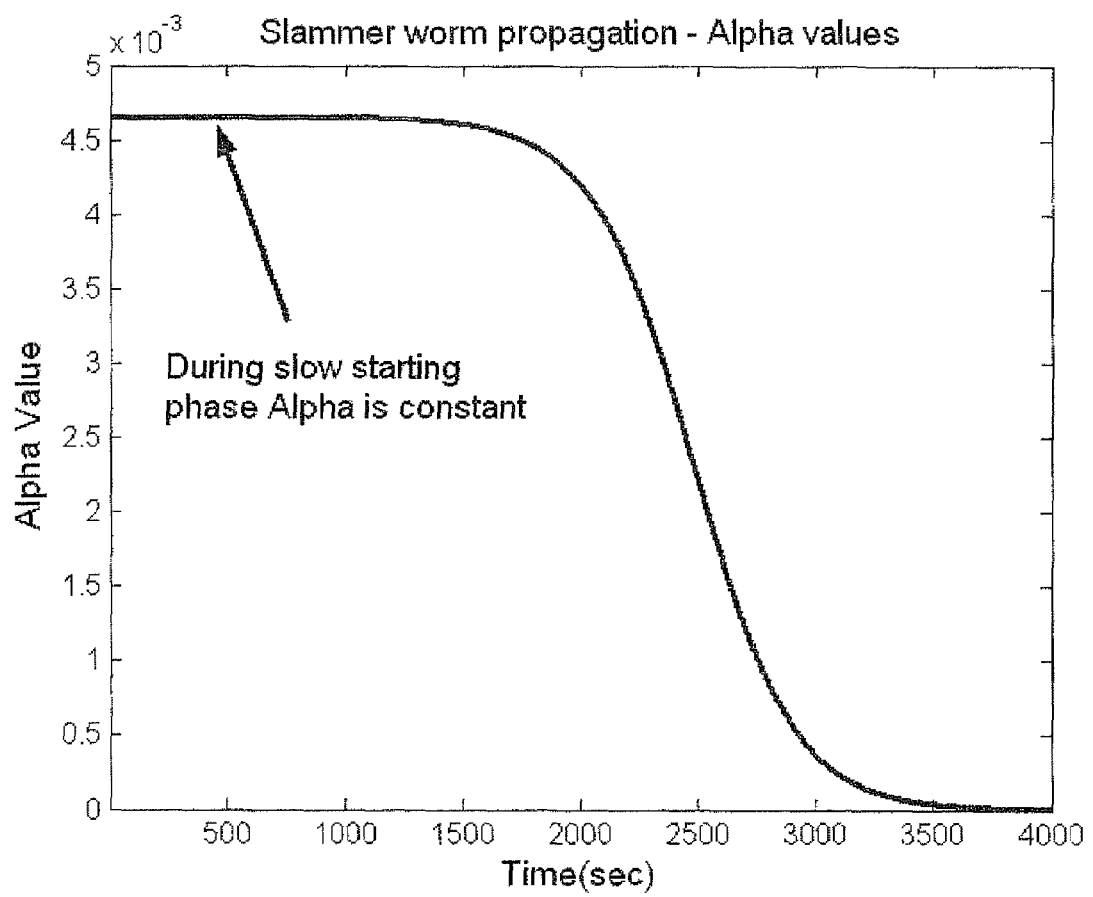
FIGS. 5, 6, and 7 provide analytical models for a Slammer worm, for a P2P worm, and for a Love Letter worm respectively.
Figure 6:
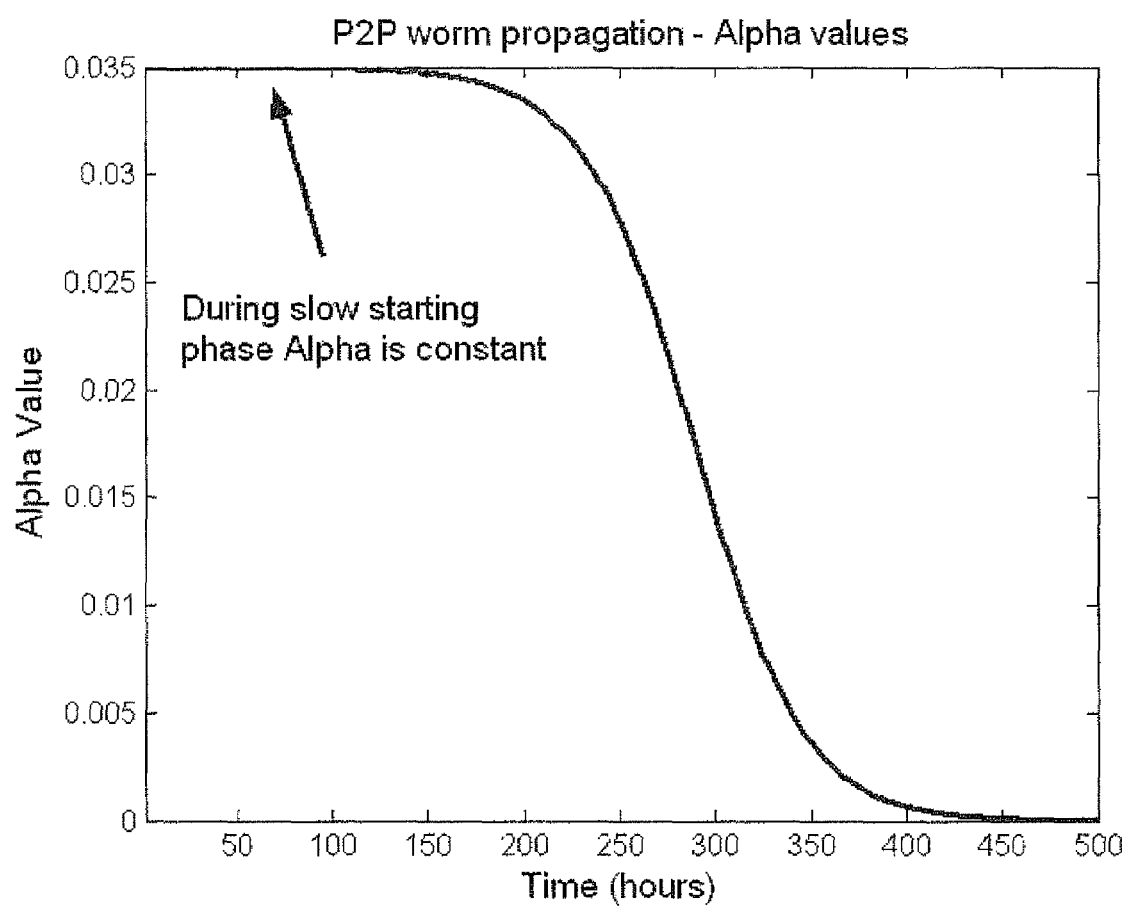
Figure 7:
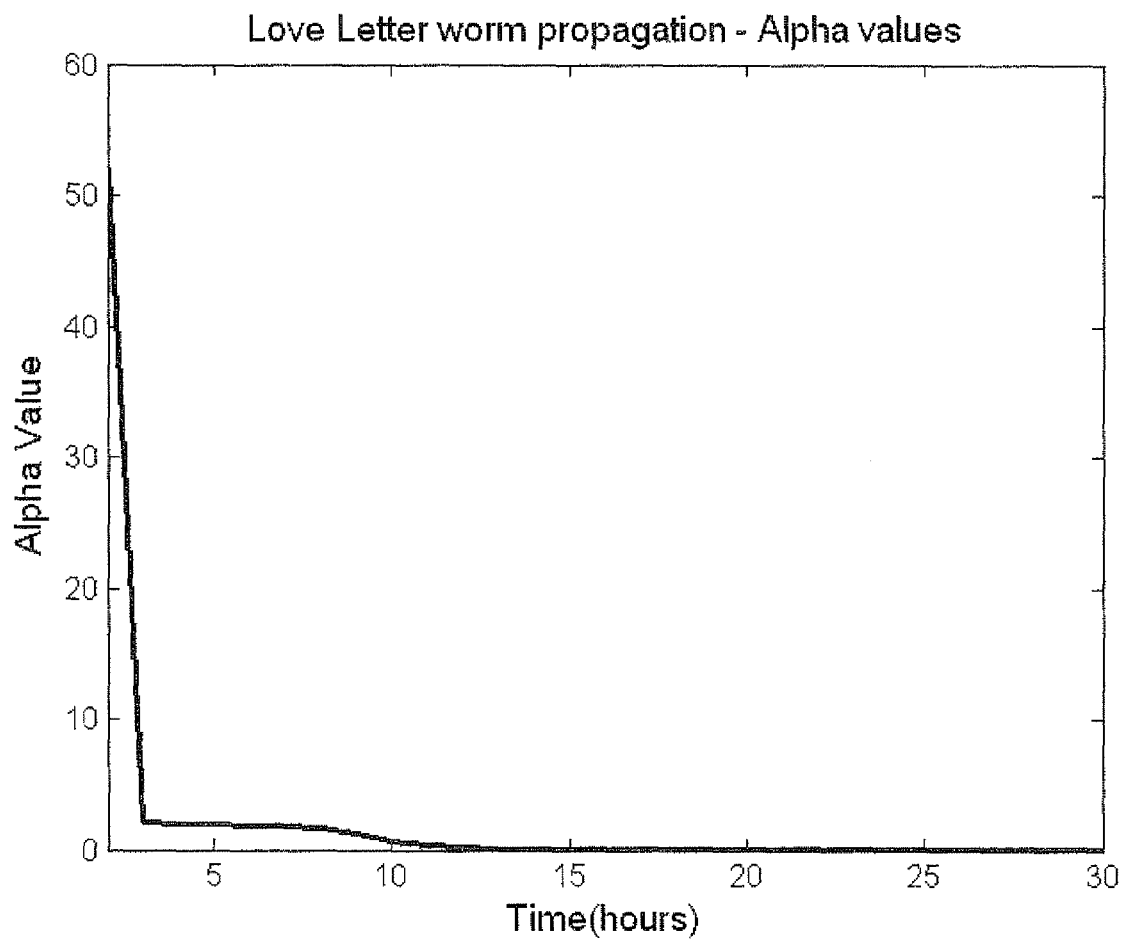
Figure 8:
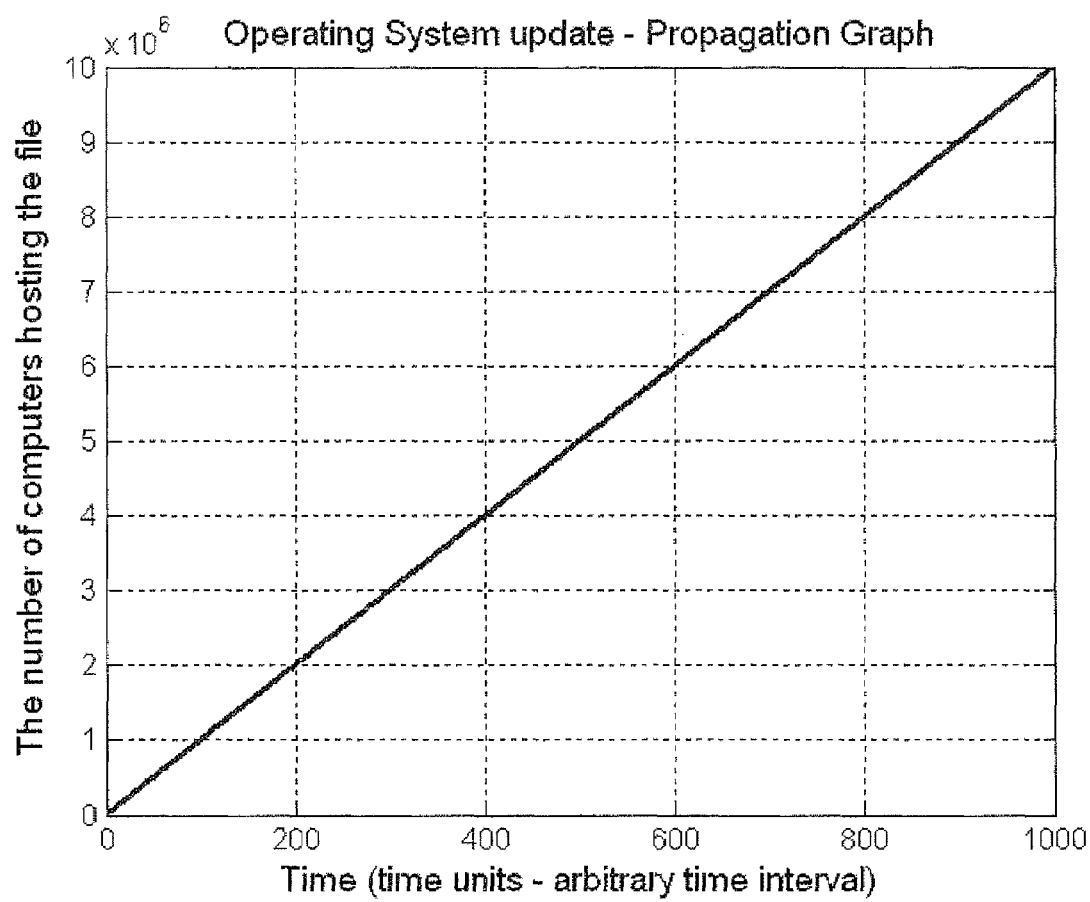
FIG. 8 provides an assumed propagation graph for a legitimate file.
Figure 9:
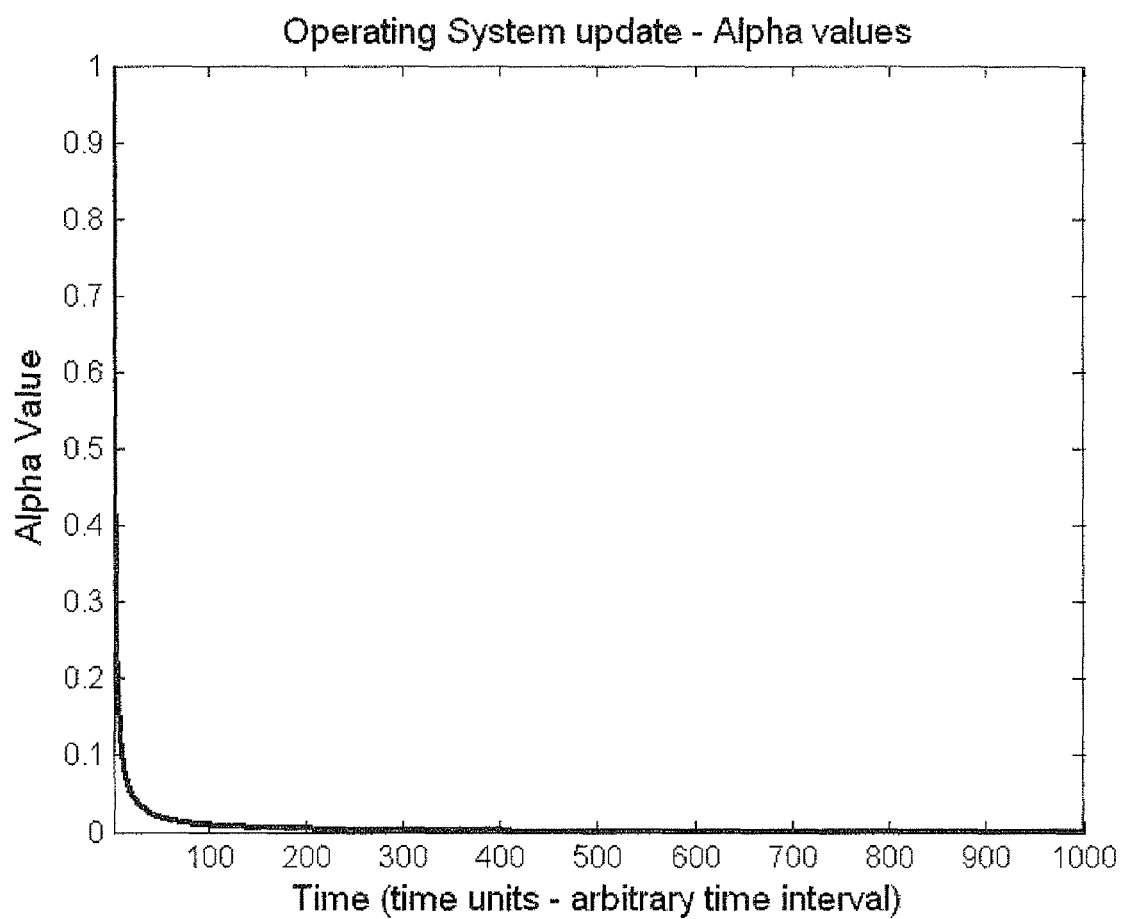
FIG. 9 provides the corresponding α values for the case of FIG. 8.

A similar result was also presented in [2] for the Internet random scanning worms only. From equation (13) it can be concluded that by measuring the ratio $I(t)/I(t-1)$ over some initial period of time and computing the resulting $\alpha$, and if the value resulted is approximately constant greater than zero ($\alpha>0$), it means that the behavior exhibits an exponential propagation behavior of the file. This is demonstrated in FIGS. 5-7 which are the results of the analytical models discussed above. More particularly, FIGS. 5, 6, and 7 provide the analytical models for a Slammer worm, for a P2P worm, and for a Love Letter worm respectively (note that for the Email worm case the constant $\alpha$ interval starts only after some period of time in which $\alpha$ decreases very fast, due to the impact of the scale-free topology [16, 17]). With respect to FIG. 7, it should be noted that the impact of the Scale Free [16, 17] topology on the worm propagation $\alpha$ jumps at the beginning of propagation due to the fact that nodes with high degree have been infected. FIG. 8 provides the assumed propagation graph for a legitimate file, and FIG. 9 provides the corresponding $\alpha$ values for the case of FIG. 8. The propagation detection module 6a (FIG. 1A) tests whether the propagation graph obtained from the various agents reports exhibits this property. If it does, the file is declared as a worm-related eThreat, and all the agents are informed of this determination. If, on the other hand, after a predefined time interval a specific file does not exhibits the above property, the file is declared as a legitimate file.

EXAMPLE

Figure 10:
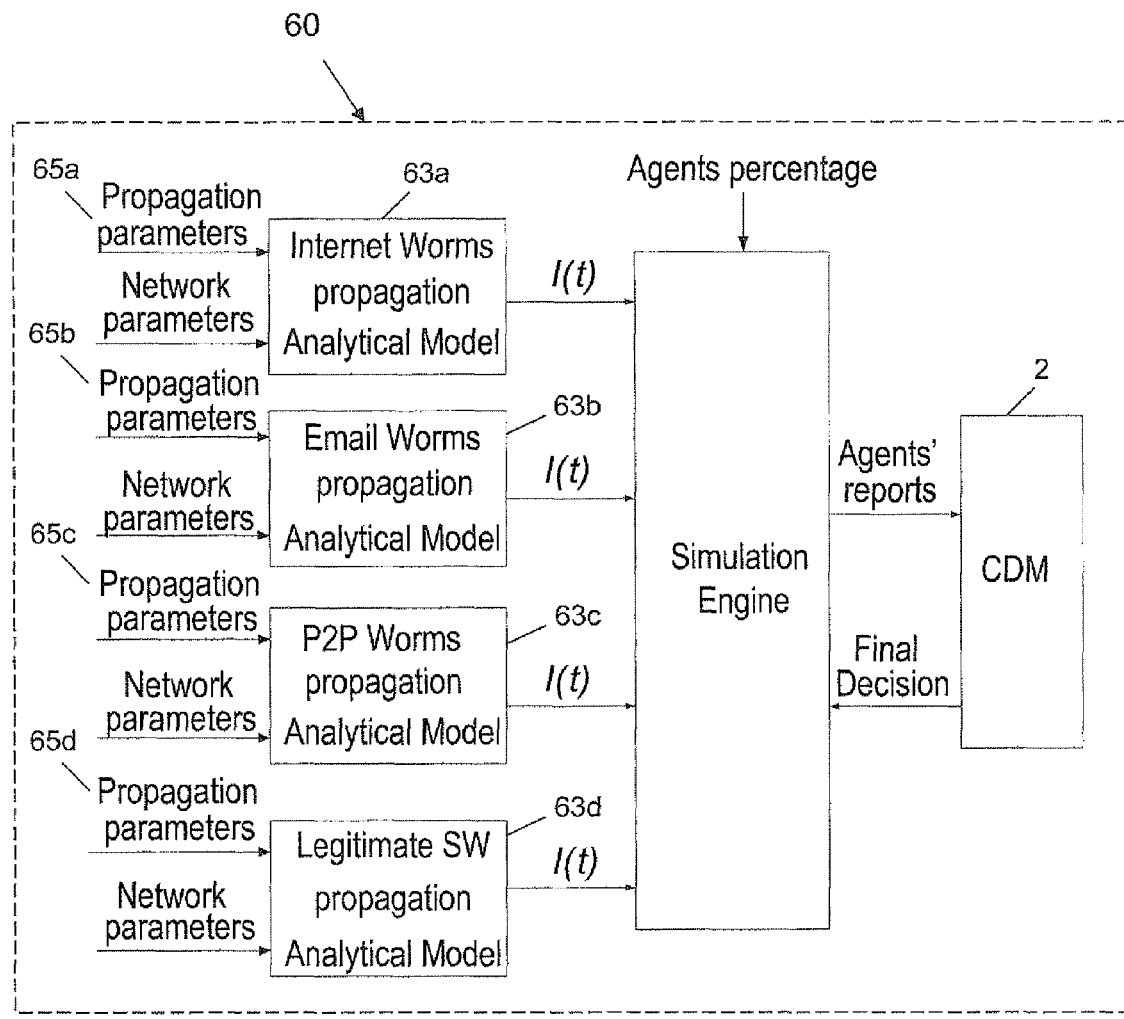
FIG. 10 illustrates in block diagram form a structure of a simulation unit that has been designed to evaluate worm detection according to an embodiment of the present invention.

FIG. 10 illustrates in block diagram form the structure of a simulation unit 60 that has been designed to evaluate worm detection according to the present invention. The CDM 2 was implemented in a manner as described above. The simulation unit has simulated the propagation of various worms throughout a network and has further simulated the agents' behavior. In general, the simulation unit has been designed to perform the following tasks:

1. Simulate the propagation of Internet worms, Email Worms, and P2P Worms by the corresponding models 63a-63c;
2. Simulate the propagation of a legitimate software by model 64;
3. Generate and send agents' reports to the CDM within the unit upon "appearance" of new executables at the "hosts" that are monitored by said agents according to the agents percentage (the agents percentage defines the number of agents in the network relative to the total number of hosts in the network).

The simulation was focused on the propagation dynamics only—and therefore was based on the analytical models 63a-63c, and 63d that were provided with real worms' parameters 65a to 65d respectively, and not on simulations of worm propagation over real networks. However, in order to justify this approach, the inventors have developed a real network simulator and compared the results of the analytical models with the simulator results. In FIG. 10, the network parameters comprise the number of nodes, the average degree (the average number of neighbors for each node in the network), the power-law degree $2<\gamma\leq 3$ see [19]. The "agents percentage" define the ratio of the agents in the network (=100% if agents are installed in all hosts). The term I(t) indicates the number of infected hosts at time t.

Figure 14:
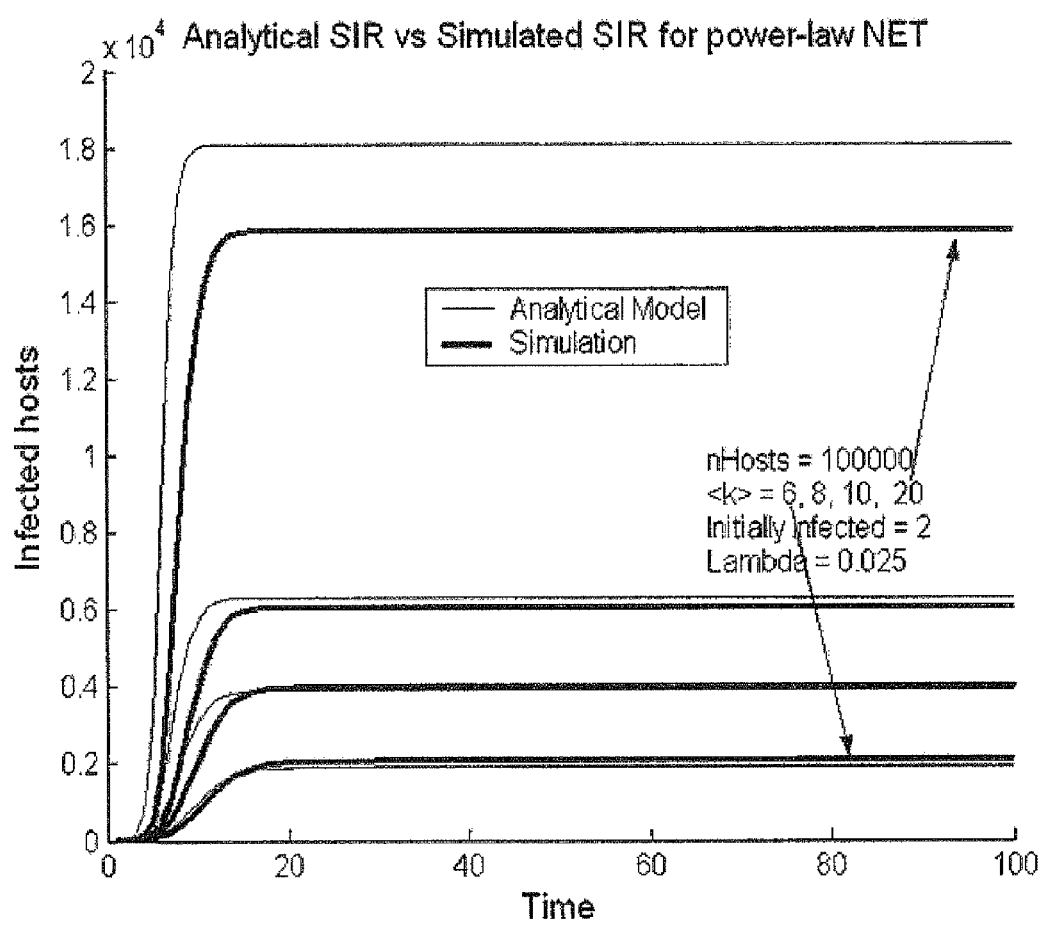
FIG. 14 shows a comparison for Email worms between the analytical model and the simulation.
Figure 15:
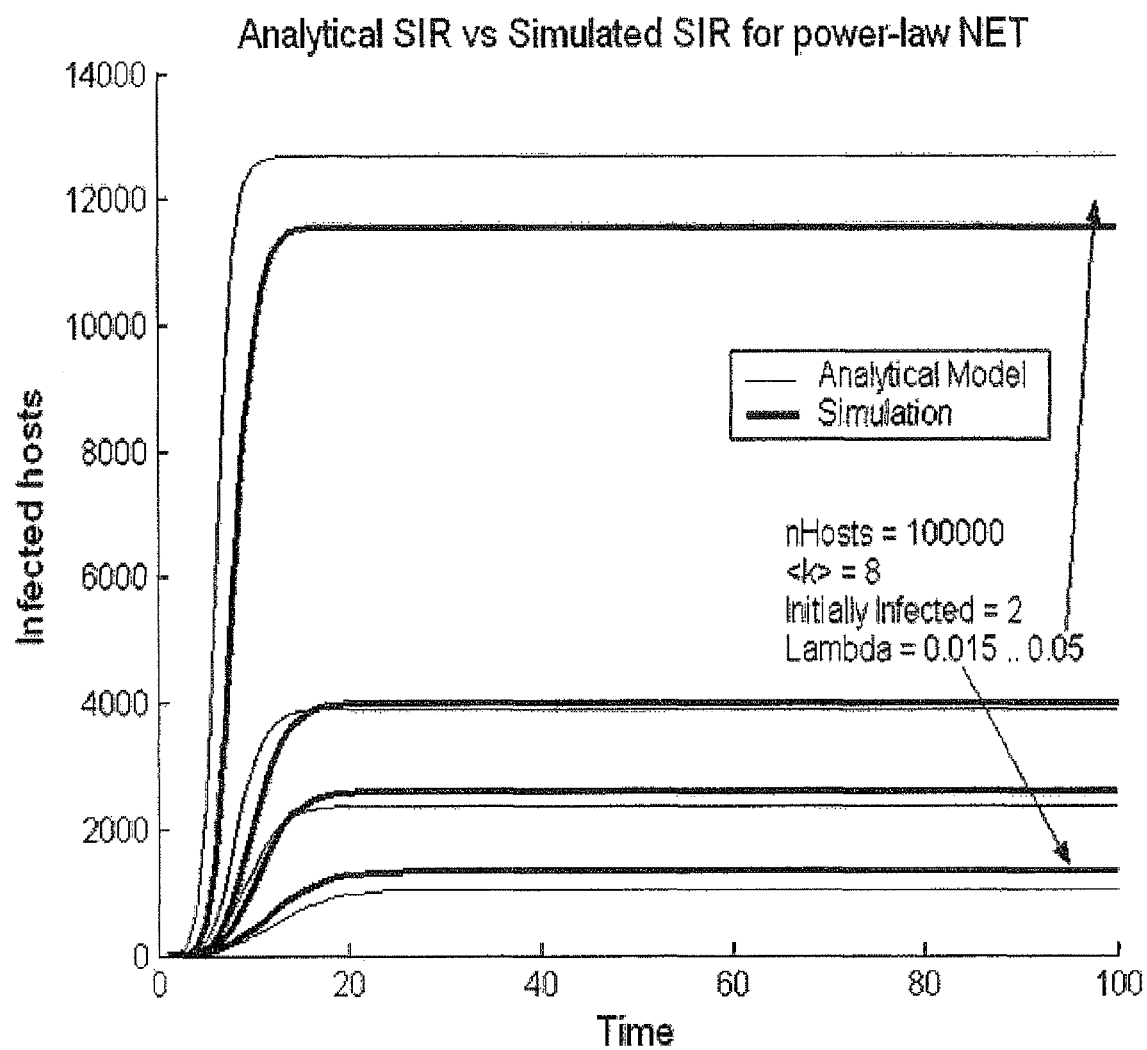
FIG. 15 shows another comparison for Email worms between the analytical model and the simulation.

A comparison between the results of the analytical model and the results of the network simulator are depicted in FIGS. 14 and 15 for the Email worms. More particularly, FIG. 14 shows a comparison of an analytical model with a simulation for Email worms—particularly the impact of an average network degree <k> (the average degree <k> indicates the average number of neighbors for each node) on the propagation. FIG. 15 shows a comparison of result of the analytical model with the results of the simulation for Email worms—particularly the impact of λ (this is a probability of a node to be infected by one of its neighbors) values on propagation.

From FIGS. 14 and 15 it is evident that the simulation exhibits exactly the same propagation properties, (i.e., a slow starting phase during which the number of infected hosts grows exponentially, which follows by an explosive growth phase during which the number of infected hosts grows linearly until saturation is reached), as the analytical model (see also [14]). Similar results were obtained for the other worm classes.

Having implemented the simulation unit, the inventors have simulated the propagation of the Slammer worm as a representative of Internet worms using the parameters obtained from [20], and the propagation of the Love Letter worm as a representative of Email worms using the parameters obtained from [23]. The inventors have not found any statistical information regarding propagation of some concrete P2P worms and empirical parameters as presented in [13] were used to simulate propagation of such worm.

In order to show that the present invention does not produce false alarms the inventors also simulated the propagation of legitimate software. The simulation assumed that legitimate software propagates linearly. It means that the same fraction of hosts distributed uniformly in the network will acquire the instance of some legitimate file at any time t. This assumption is reasonable for example for popular software/operating system updates. FIG. 8 provides an example for the propagation of such a legitimate files while FIG. 9 plots the α values calculated from equation (13).

Figure 11:
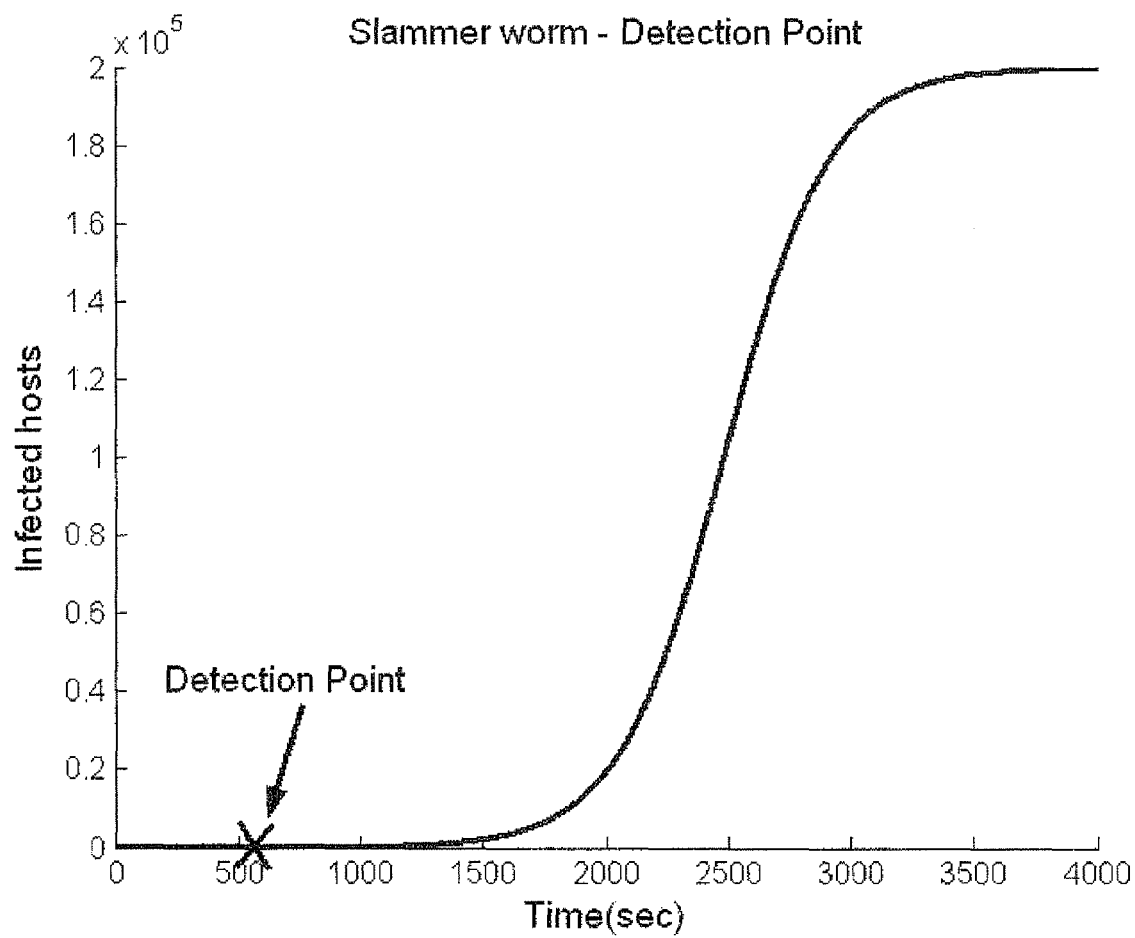
FIG. 11 shows the simulation results for Internet worm.
Figure 12:
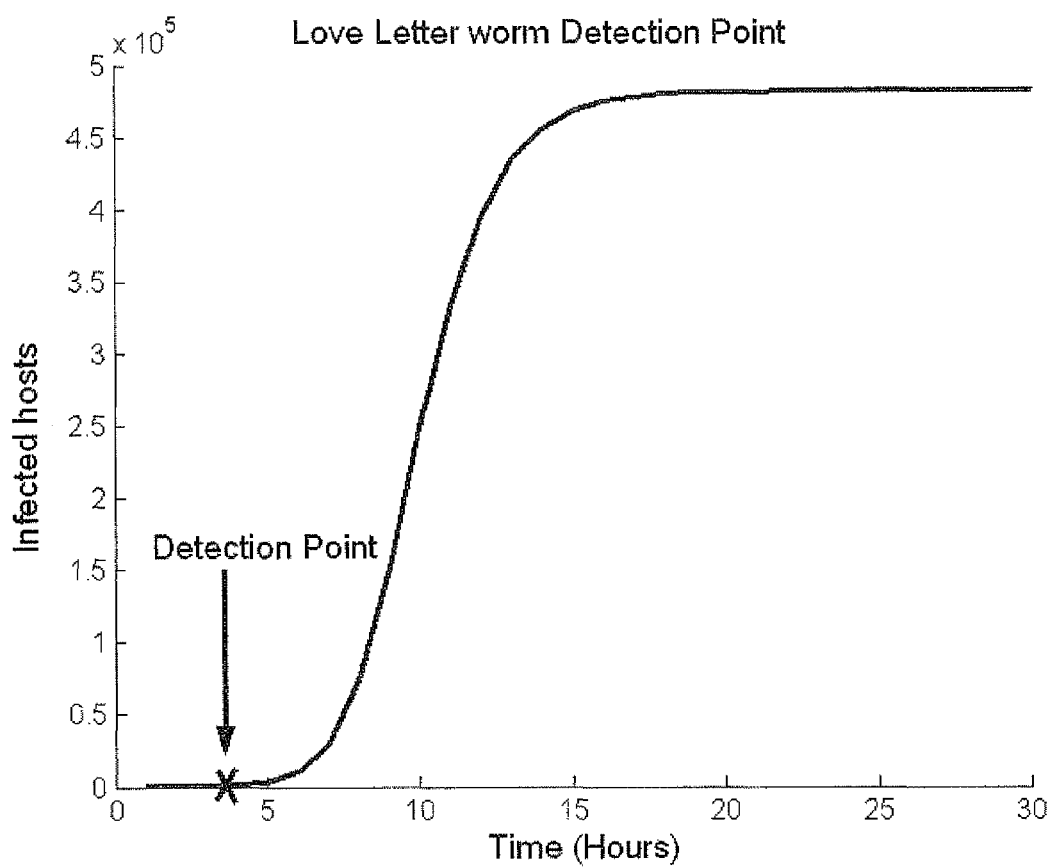
FIG. 12 shows the simulation results for an Email worm.
Figure 13:
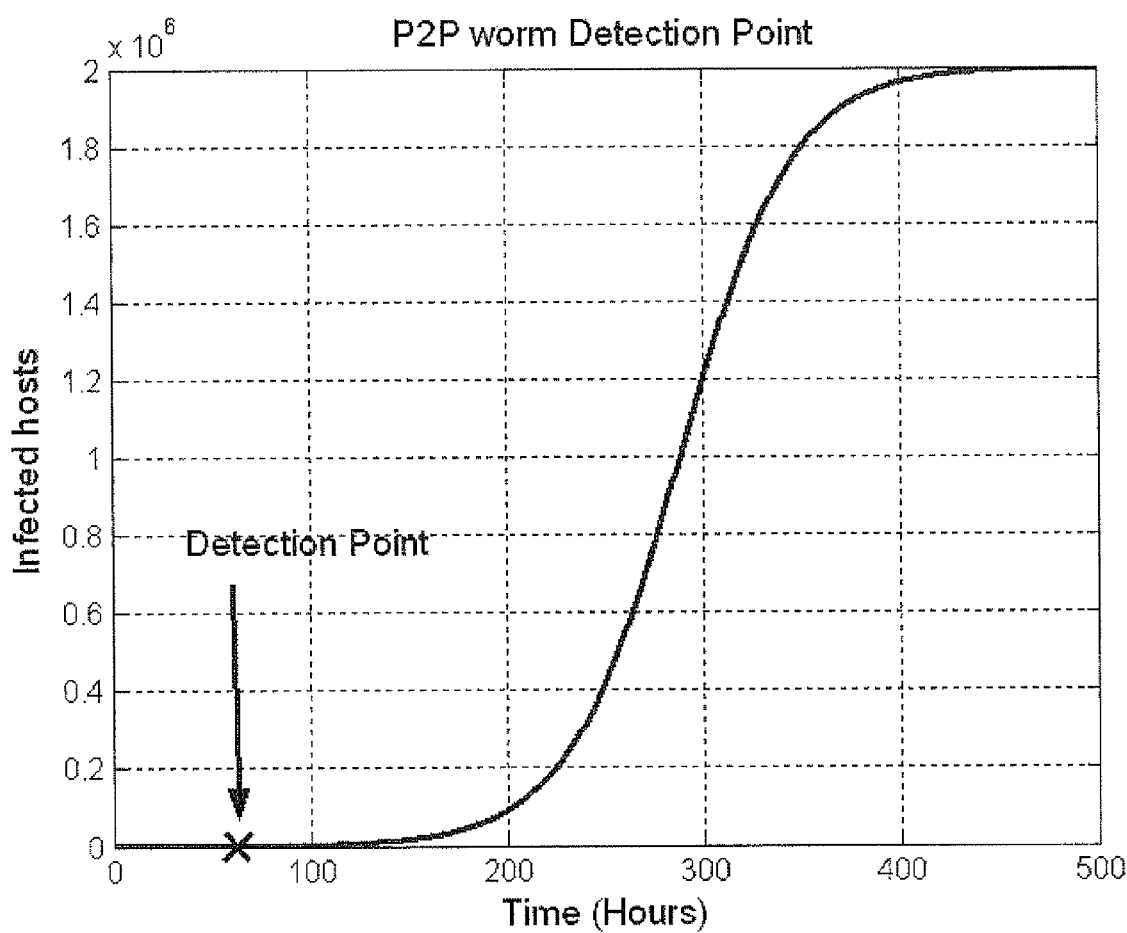
FIG. 13 shows the simulation results for a P2P worm.

FIG. 11-13 provide the simulation results. FIG. 11 shows that an Internet worm was detected in the simulation after the infection of 40 hosts out of 200000 that were simulated to exist in the network. FIG. 12 shows that an Email worm was detected in the simulation after the infection of 750 hosts out of 480000 that were simulated to exist in the network. FIG. 13 shows that a P2P worm was detected in the simulation after the infection of 1500 hosts out of 2000000 that were simulated to exist in the network. It can be seen that each one of worm types has been detected at a very earlier stage of its propagation throughout the network. At this early stage, all the agents have been informed about the worms' details and could perform the containment process. Legitimate software was not declared as worm (α values continuously decrease).

It should be noted that in the evaluation above an agent was installed on each computer in the network. Note that the same results could be produced with small number of agents that are distributed uniformly in the network (because the number of agents has no impact on the α value).

The discussion above and the simulation results have shown that there are common propagation characteristics for all classes of worm-related eThreats, that distinguish them from propagation characteristics of legitimate files. The invention provides a distributed system that employs these distinct characteristics for the detection purposes. The simulation results show that the system of the invention can detect various types of new worms during the very early propagation stage. An advantage of the invention is that it does not require use of any special device and it can be implemented on existing infrastructures (for example, as a part of antivirus software).

In still another embodiment of the invention, the agents may be installed only at central nodes of the physical or sociological network (see [24]).

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

BIBLIOGRAPHY

1. D. Moore, C. Shannon, and J. Brown. Code-Red: A Case Study on the Spread and Victims of an Internet Worm. In Proceedings of the ACM Internet Measurement Workshop, November 2002.
2. C. C. Zou, L. Gao, W. Gong, D. Towsley. Monitoring and early warning for internet worms. In Proceedings of the 10th ACM conference on Computer and communications security, Washington, 2003.
3. S. Singh, C. Estan, G. Varghese, and S. Savage. Automated Worm Fingerprinting. In Proceedings of the 6th Symposium on Operating System Design and Implementation (OSDI), 2004.
4. J. Mewsome, B. Karp and D. Song. Polygraph: automatically generating signatures for polymorphic worms. In Proceedings of the Security and Privacy, 2005 IEEE Symposium.
5. Spitzner. Honeypots: Tracking Hackers. Addison Wesley, 2003.
6. G. Portokalidis, A. Slowinska and H. Bos. Argos: an Emulator for Fingerprinting Zero-Day Attacks. In Proceedings of ACM SIGOPS EUROSYS 2006, Leuven, Belgium, April 2006.
7. T. Vogt. Simulating and Optimizing Worm Propagation Algorithms. September 2003. http://www.securityfocus.com/library/WormPropagation.pdf.
8. http://www.symantec.com.bo/region/se/seresc/download/istr_sept_2004.p df. Symantec Internet Security Threat Report.
9. Brent N. Chun, Jason Lee and Hakim Weatherspoon. Netbait: a Distributed Worm Detection Service. Intel Research Berkeley Technical Report IRB-TR-03-033, September 2003.
10. C. Kreibich and j. Crowcroft. Honeycomb—creating intrusion detection signatures using Honeypots. In Proceedings of the Second Workshop on Hot Topics in Networks (HotNets-II), November 2003.
11. H. A. Kim and B. Karp. Autograph: toward automated, distributed worm signature detection. In Proceedings of the 13th USENIX Security Symposium, August, 2004.
12. S. Forrest. A Sense of Self for UNIX Processes. In Proceedings of the IEEE Symposium on Security and Privacy. Oakland, Calif. 120-128. 1996.
13. R. Thommes and M. Coates. Epidemiological Modeling of Peer-to-Peer Viruses and Pollution. In Proceedings of IEEE Infocom 2006.
14. C. C. Zou, D. Towsley and W. Gong. Modeling and Simulation Study of the Propagation and Defense of Internet E-mail Worms. IEEE Transactions on dependable and secure computing, vol. 4, no. 2, April-June 2007.
15. R. M. Anderson and R. M. May. Infectious diseases in humans, (Oxford University Press, Oxford, 1992).
16. R. Pastor-Satorras, A. Vespignani. Epidemic dynamics and endemic states in complex networks, Physical Review E 63, 2001.
17. Y. Moreno, R. Pastor-Satorras, and A. Vespignani. Epidemic outbreaks in complex heterogeneous networks. Eur. Phys. J. B 26, 521-529 (2002).
18. R. Pastor-Satorras and A. Vespignani. Epidemic spreading in scale-free networks. Phys. Rev. Lett. 86, 3200-3203 (2001).

19. C. Faloutsos, M. Faloutsos, P. Faloutsos. On power-law relationships of the internet topology. In Proceedings of ACM SIGCOMM, August 1999.
20. D. Moore, V. Paxson, S. Savage, C. Shannon, S. Staniford, N. Weaver. Inside the Slammer worm. Security & Provacy, IEEE, July-August 2003
21. S. Staniford, V. Paxson, N. Weaver. How to own the Internet in your spare time. In Proceedings of USENIX Security Symposium, 2002 August.
22. C. Zou, D. Towsley, and W. Gong. On the Performance of Internet Worm Scanning Strategies. Performance Evaluation Journal, vol. 63, no. 7, July 2006.
23. http://www.cert.org/advisories/CA-2000-04.html.
24. M. Tubi, R. Puzis, Y. Elovici. Deployment of DNIDS in Social Networks. ISI 2007: 59-65.
25. http://www.viruslist.com/

The invention claimed is:

1. A distributed computer implemented system for detecting eThreats that propagate in a network, which comprises:
   graphs database within a Central Decision Maker module (CDM) storing in digital form at least one propagation graph, each propagation graph describing the typical propagation over time of one eThreat class or a legitimate executable class within the network;
   plurality of agents that are distributed in corresponding plurality of host computers within the network, each of said agents continuously monitoring a corresponding host computer and reporting to said Central Decision Maker module the identity of any new suspected executable, and the time in which said suspected executable has been first detected by said agent;
   said CDM module which comprises:
   (i) a graph creation unit for receiving all said reports from said plurality of agents, creating from said reports for each suspected executable a corresponding propagation graph which reflects the propagation characteristics over time of said suspected executable within the network,
   (ii) a comparator for (a) comparing each of said created graphs with said stored at least one propagation graph, (b) upon finding a similarity above a predefined threshold between a created graph and one of the stored graphs, concluding respectively that said executable belongs to the class as defined by said stored graph, and (c) conveying said conclusion to said agents, for optionally taking an appropriate action at the host computers respectively; and
   wherein, one of the graphs in said database which relates to a worm-type eThreat class has a value of $\alpha$ as a function of time which is constant within a predefined time interval and larger than zero during an initial propagation phase of said executable, and the CDM concludes that the executable is a worm when a similarity above a predefined threshold is found between said created graph and said stored graph which relates to a worm, and wherein $\alpha$=(number of infected host computers at time t)/(number of infected host computers at time t−1).

2. The system according to claim 1, wherein the report by the agents also comprises the identity of the report issuing agent.

3. The system according to claim 1, wherein the comparison by the CDM module is repeated plurality of times for each executable until a final conclusion is reached.

4. The system according to claim 1, wherein each of the agents further performs analysis at the host computer location, for at least reaching a temporary conclusion regarding the type of the executable in question, and further sends said temporary conclusion to said CDM module.

5. The system according to claim 1, wherein further:
   the database comprises null graphs; and
   the CDM module calculates from the created graph the value of $\alpha$ as a function of time, and if the value of $\alpha$ is found to be approximately constant within predefined limits and larger than zero during an initial propagation phase of said executable, the CDM module concludes that the executable is a worm.

6. The system according to claim 1, wherein the propagation is defined as the number of host computers that include an executable respectively as a function of time.

* * * * *